US012593266B2

(12) United States Patent
Bouazizi et al.

(10) Patent No.: US 12,593,266 B2
(45) Date of Patent: Mar. 31, 2026

(54) METHOD AND APPARATUS FOR MEDIA APPLICATION FUNCTION EXPOSURE FUNCTIONALITY

(71) Applicant: QUALCOMM Incorporated, San Diego, CA (US)

(72) Inventors: Imed Bouazizi, Frisco, TX (US); Charles Nung Lo, San Diego, CA (US); Juan Zhang, Beijing (CN); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 251 days.

(21) Appl. No.: 18/006,347

(22) PCT Filed: Oct. 1, 2020

(86) PCT No.: PCT/CN2020/119771

§ 371 (c)(1),
(2) Date: Jan. 20, 2023

(87) PCT Pub. No.: WO2022/067838

PCT Pub. Date: Apr. 7, 2022

(65) Prior Publication Data

US 2023/0292226 A1 Sep. 14, 2023

(51) Int. Cl.
| | |
|---|---|
| *H04W 48/16* | (2009.01) |
| *H04W 12/06* | (2021.01) |
| *H04W 12/08* | (2021.01) |

(52) U.S. Cl.
CPC ........... *H04W 48/16* (2013.01); *H04W 12/06* (2013.01); *H04W 12/08* (2013.01)

(58) Field of Classification Search
CPC ..... H04W 48/16; H04W 12/06; H04W 12/08; H04W 4/50; H04L 41/142; H04L 41/5067;
(Continued)

(56) References Cited

U.S. PATENT DOCUMENTS

| | | | |
|---|---|---|---|
| 8,914,810 B1 | 12/2014 | Brockners | |
| 10,582,349 B1 * | 3/2020 | Huang | ................... H04W 4/18 |

(Continued)

FOREIGN PATENT DOCUMENTS

| | | |
|---|---|---|
| CN | 109997334 A | 7/2019 |
| CN | 110120879 A | 8/2019 |

(Continued)

OTHER PUBLICATIONS

International Search Report and Written Opinion—PCT/CN2020/119771—ISA/EPO—Jun. 24, 2021.
(Continued)

*Primary Examiner* — Brian J. Gillis
*Assistant Examiner* — Thao D Duong
(74) *Attorney, Agent, or Firm* — Shumaker & Sieffert, P.A.

(57) ABSTRACT

Embodiments include methods and devices for media application function (AF) exposure functionality. Various aspects may include receiving an access configuration message for a service or application provider, the access configuration message including an indication of one or more event types and parameters, one or more exposure levels, and aggregation rules. Various embodiments may include an AF server subscribing other computing devices to event types and parameters for the service or application based on the exposure level of the other computing device.

44 Claims, 15 Drawing Sheets

(58) Field of Classification Search
CPC ..... H04L 43/06; H04L 43/08; H04L 41/0806; H04L 41/0894; H04L 41/5041; H04L 9/3213
See application file for complete search history.

(56) References Cited

U.S. PATENT DOCUMENTS

| | | | |
|---|---|---|---|
| 2019/0230645 A1 | 7/2019 | Cheng et al. | |
| 2020/0028973 A1* | 1/2020 | Livanos | H04L 12/1428 |
| 2020/0029249 A1* | 1/2020 | Livanos | H04W 8/02 |
| 2020/0068653 A1* | 2/2020 | Li | H04L 12/14 |
| 2021/0144517 A1* | 5/2021 | Guim Bernat | G06F 9/5072 |
| 2022/0247678 A1* | 8/2022 | Atwal | H04B 7/18519 |
| 2023/0078448 A1* | 3/2023 | Cella | G06Q 10/06311 |
| | | | 705/7.13 |

FOREIGN PATENT DOCUMENTS

| | | |
|---|---|---|
| CN | 111052787 A | 4/2020 |
| CN | 111247821 A | 6/2020 |
| CO | 2021005932 A2 | 6/2021 |
| TW | 201922003 A | 6/2019 |
| TW | 201924428 A | 6/2019 |
| WO | WO-2012148442 A1 | 11/2012 |
| WO | WO-2014130091 A1 | 8/2014 |
| WO | WO-2020035157 A1 | 2/2020 |
| WO | WO-2020071887 A1 | 4/2020 |
| WO | WO-2020074126 A1 | 4/2020 |
| WO | 2020146076 A1 | 7/2020 |

OTHER PUBLICATIONS

3GPP: "3rd Generation Partnership Project, Technical Specification Group Services and System Aspects, System Architecture for the 5G System (5GS), Stage 2 (Release 16)", 3GPP TS 23.501 V16.5.1, Aug. 2020, pp. 1-431.

3GPP: "3rd Generation Partnership Project, Technical Specification Group Services and System Aspects, System Architecture for the 5G System (5GS), Stage 2 (Release 16)", 3GPP TS 23.501 V16.5.1, Aug. 2020, pp. 1-431, Section 5.4.3.3.

Taiwan Search Report—TW110132925—TIPO—Jan. 10, 2025.

3GPP: "3rd Generation Partnership Project, Technical Specification Group Services and System Aspects, Architecture Enhancements for 5G System (5GS) to Support Network Data Analytics Services (Release 16)", 3GPP TS 23.288 V16.5.0, Sep. 24, 2020, pp. 1-65, pp. 16-18.

3GPP: "3rd Generation Partnership Project, Technical Specification Group Services and System Aspects, Procedures for the 5G System (5GS), Stage 2 (Release 16)", 3GPP TS 23.502 V16.6.0, 24, Sep. 2024, pp. 1-591, pp. 553-555.

3GPP: "3rd Generation Partnership Project, Technical Specification Group Services and System Aspects, Study on Enablers for Network Automation for the 5G System (5GS), Phase 2(Release 17)", 3GPP TR 23.700-91 V1.0.0, Sep. 11, 2020, pp. 1-304, pp. 130-131, 141-142, 261-262, 265-266.

ETSI: "5G, System Architecture for the 5G System (5GS) (3GPP TS 23.501 version 16.5.1 Release 16)", ETSI TS 123 501 V16.5.1, Sep. 2020, pp. 1-442, p. 87, p. 248.

ETSI TS 123 501 V16.5.1: "5G, System Architecture for the 5G System (5GS) (3GPP TS 23.501 version 16.5.1 Release 16)", Sep. 21, 2020, 400 Pages, XP093164234, clause 5.3.4.4.

Supplementary European Search Report—EP20955858—Search Authority—Munich—Jun. 3, 2024.

ETSI TS 123 501 V16.5.1: "5G, System Architecture for the 5G System (5GS) (3GPP TS 23.501 version 16.5.1 Release 16)", Sep. 21, 2020, 443 Pages, XP093164234, pp. 1-433, p. 17, Scope p. 87, Section 5.3.4.4, p. 386, Section 7.2.19.

* cited by examiner

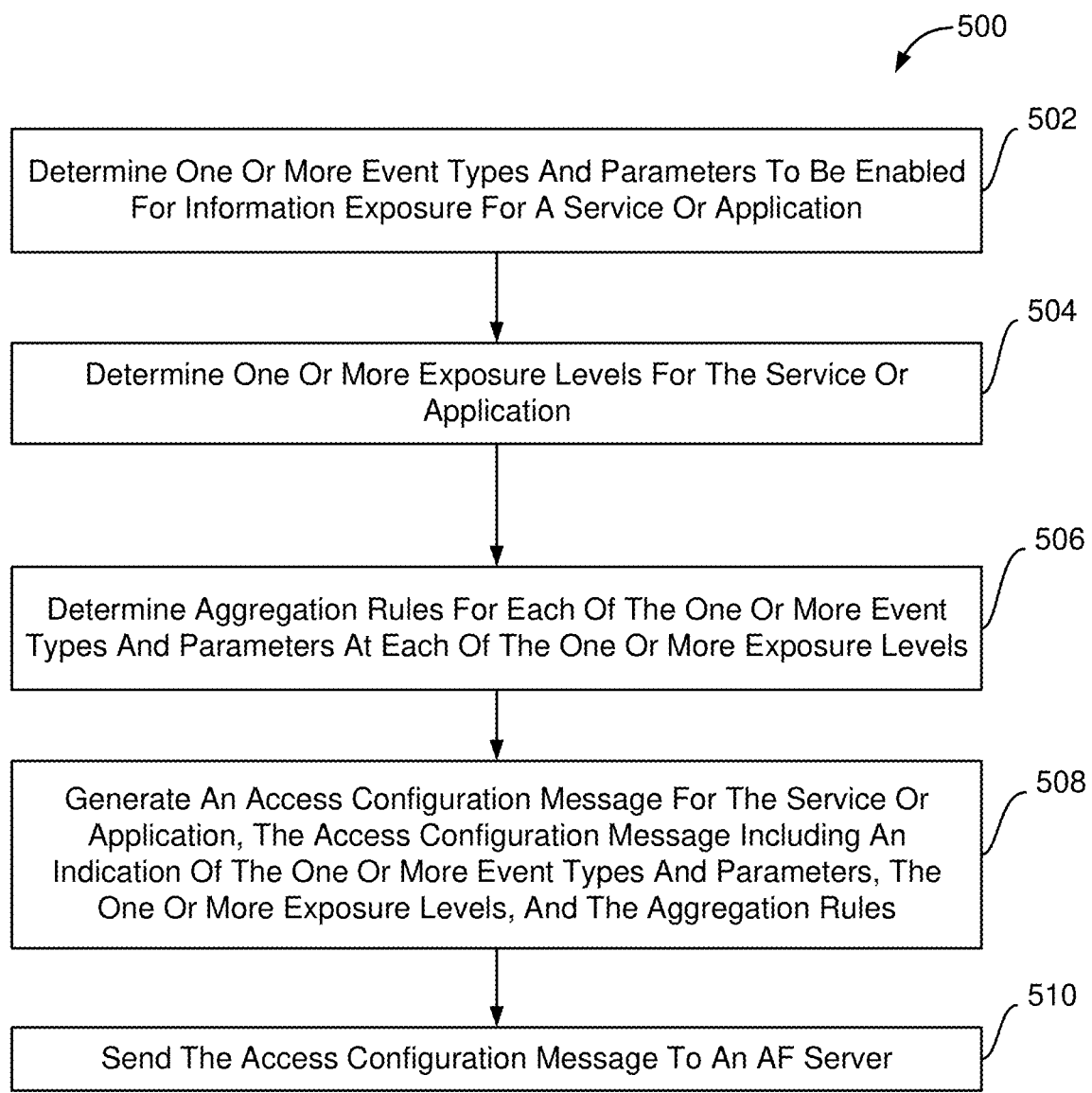

500

502
Determine One Or More Event Types And Parameters To Be Enabled For Information Exposure For A Service Or Application 504
Determine One Or More Exposure Levels For The Service Or Application 506
Determine Aggregation Rules For Each Of The One Or More Event Types And Parameters At Each Of The One Or More Exposure Levels 508
Generate An Access Configuration Message For The Service Or Application, The Access Configuration Message Including An Indication Of The One Or More Event Types And Parameters, The One Or More Exposure Levels, And The Aggregation Rules 510
Send The Access Configuration Message To An AF Server

FIG. 5A

| Event Type | Parameter | Access Level | Aggregation | Grouping | Authorization |
| --- | --- | --- | --- | --- | --- |
| 552 | 554 | 556 | 558 | 560 | 562 |
| Hosting | Downlink_ bytes | 1 | User:{None,AVERAGE,SUM} Time:{None,SUM} Session:{None,AVERAGE,SUM} | All | URL To Authorization Server |
| | | 2 | User:{AVERAGE,SUM} Time:{None,SUM} Session:{AVERAGE,SUM} | Time Period, Location, User Group, Content Id | URL To Authorization Server |
| | | Default | User:{AVERAGE,SUM} Time:{SUM} Session:{SUM} | Time Period, User Group | None |

METHOD AND APPARATUS FOR MEDIA APPLICATION FUNCTION EXPOSURE FUNCTIONALITY

RELATED APPLICATIONS

This application claims the benefit of priority as a national stage application of PCT Application No. PCT/CN2020/119771 entitled "Method and Apparatus for Media Application Function Exposure Functionality" filed 1 Oct. 2020, which is incorporated herein by reference for all purposes.

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements have facilitated the emergence of new ways to deliver media and content to mobile wireless devices, including broadcast, multicast and unicast media delivery technologies.

SUMMARY

Various aspects include methods and devices for media application function (AF) exposure functionality. Various aspects may include methods performed by a processor of a service or application provider server for controlling access to logs associated with a service or application provisioned over a fifth generation (5G) system (5GS) network. Various aspects may include determining one or more event types and parameters to be enabled for information exposure for a service or application information exposure for a service or application, determining one or more exposure levels for the service or application, determining aggregation rules for each of the one or more event types and parameters at each of the one or more exposure levels, generating an access configuration message for the service or application, the access configuration message including an indication of the one or more event types and parameters, the one or more exposure levels, and the aggregation rules, and sending the access configuration message to an AF server.

Some aspects may further include receiving an authorization request associated with another computing device, determining whether the other computing device is authorized for access to logs determining whether the other computing device is authorized for access to for the service or application, determining a metrics exposure level for the other device in response to determining the other computing device is authorized for access to logs for the service or application, and send an authorization confirmation indicating the exposure level for the other computing device. In some aspects, the authorization confirmation may include a token for the other device indicating the exposure level for the other device. In some aspects, the other computing device may be a Network Data Analytics Function (NWDAF) server.

Various aspects include methods for controlling access to logs associated with a service or application performed by a processor of an application function (AF) server of a fifth generation (5G) system (5GS). Various aspects may include receiving an access configuration message from a service or application provider, the access configuration message including an indication of one or more event types and parameters, one or more exposure levels, and aggregation rules for a service or application, receiving a subscription request for logs of the service or application from another computing device, determining an exposure level of the other computing device, determining the event types and parameters for the service or application and aggregation rules for the event types and parameters based at least in part on the access configuration message for the service or application and the exposure level of the other computing device, generating a subscription response message for the other computing device indicating the event type and parameters for the service or application and aggregation rules for the event types and parameters, and sending the subscription response message to the other computing device.

Some aspects may further include receiving reports for the service or application from one or more wireless devices consuming the service or application, receiving a request for available from the other computing device, authenticating the other computing device in response to receiving the request for available logs from the other computing device, determining an exposure level of the other device based on the authentication, generating a logs report according to the exposure level for the service or application associated with the determined access level of the other computing device based on the reports for the service or application from the one or more wireless devices consuming the service or application, and sending the logs report to the other device. In some aspects, determining an exposure level of the other computing device may include authenticating a token for the other device indicating the exposure level for the other device.

In some aspects, the aggregation rules may include aggregation functions, aggregation periods, and/or aggregation groups for the service or application. In some aspects, the aggregation functions may include one or more of a COUNT function, an AVERAGE function, a MEDIAN function, a MINIMUM function, a MAXIMUM function, or a SUM function. In some aspects, the aggregation periods may include a session or a time period. In some aspects, the aggregation groups may include users individually, user groups, user locations, a content identifier, a subscription type, or all users together. In some aspects, the one or more event types may include one or more of content hosting event types, Quality of Service (QoS)/charging and network assistance event types, consumption event types, or Quality of Experience (QoE) event types. In some aspects, the service or application may be a 5G Media Streaming (5GMS) service or application.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above. Further aspects may include a network computing device having a processor configured to perform one or more operations of the methods summarized above. Further aspects may include a non-transitory processor-readable storage medium having stored thereon processor-executable instructions configured to cause a processor of a network computing device to perform operations of the methods summarized above. Further aspects include a network computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5A is a process flow diagram illustrating a method for controlling access to logs associated with a service or application in accordance with various embodiments.

FIG. 5B is an example schema of an access configuration message in accordance with various embodiments.

DETAILED DESCRIPTION

Figure 1:
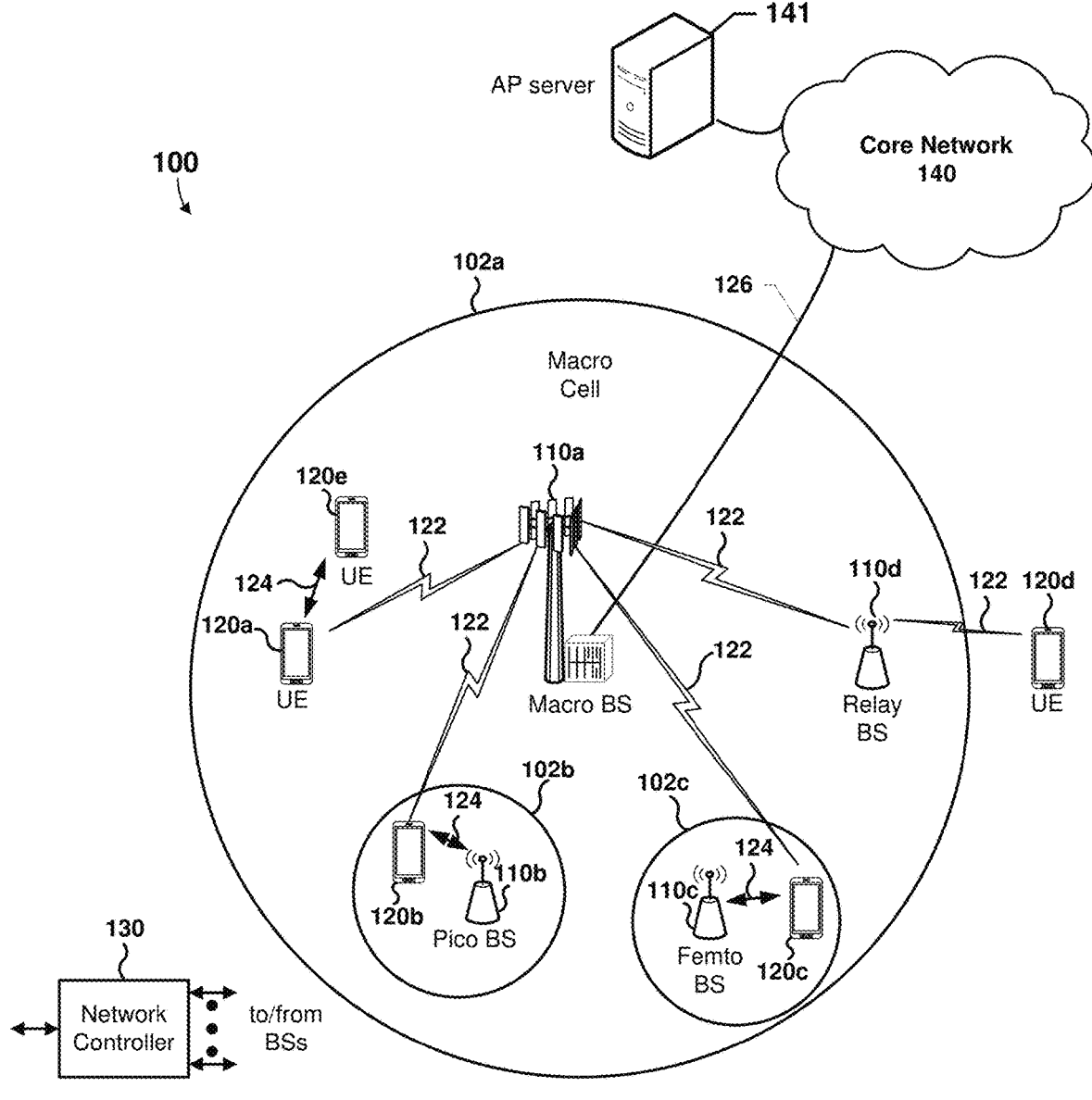
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and devices for media application function (AF) exposure functionality. Various embodiments include methods for controlling access to logs, such as logs of collected data (e.g., metrics, measurements, etc.) associated with a service or application performed by a processor of an application function (AF) server of a fifth generation (5G) system (5GS). Various embodiments enable the level of access to collected information to be controlled for different network functions. Various embodiments enable an application provider to protect the privacy of users. Various embodiments enable an application provider to prevent exposer of service-specific details to entities not authorized to receive such information. Various embodiments may preserve user and service privacy by allowing differentiated access to service and application log data and statistics. Various embodiments may be compatible with the 5G AF exposure framework. Various embodiments may be compatible with the 5G Media Streaming (also referred to as 5GMS) architecture.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA) wireless devices, etc. An MSMS wireless device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain,"

and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system (5GS) is an advanced technology from 4G LTE, and provides a new radio access technology (RAT) through the evolution of the existing mobile communication network structure. Implementations for 5GS networks are currently being adopted that provide new radio (NR) (also referred to as 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various embodiments, non-limiting examples of which include a base station, an eNodeB, a gNodeB, an Applicant Function (AF) server, Operations, Administration and Maintenance (OAM) server, applicant server, etc.

5G Media Streaming (also referred to as 5GMS) is designed such that, in particular, third-party services or applications, such as uplink (UL) and/or downlink (DL) video streaming services, etc., can be distributed using a 5GS network in order to make best use of 5G features. For example, the 5GMS architecture allows an application provider (AP) (e.g., a service or application provider) to provision services to wireless devices (e.g., user equipments (UEs)) over the M1 interface. Provisioning may include various parameters defined by the AP and/or network, such as content hosting, Quality of Service (QoS) templates, consumption and Quality of Experience (QoE) reporting, and charging policies. The network may collect and store data (e.g., metrics, measurements, statuses, statistics, other information, etc.) about the service or application reported from the wireless devices consuming the service or application. The wireless devices may send reports including the data (e.g., metrics, measurements, statuses, other information, etc.) to the network and the network may generate logs reflecting the reported data (e.g., metrics, measurements, statuses, statistics, other information, etc.). As examples, the network may collect and store data on bytes consumed by a wireless device, a transfer rate achieved during a session, cache hits, cache misses, QoS profile activations, guaranteed bitrates, session activation times, session deactivation times, location information, QoE information, etc. The AP (e.g., a service or application provider) may receive collected data (e.g., metrics, measurements, statuses, statistics, other information, etc.) about the service, such as metrics associated with ongoing and past sessions, etc. The network may share collected data (e.g., metrics, measurements, statuses, statistics, other information, etc.) among network entities, such as with a Network Data Analytics Function (NWDAF). For example, the network may send logs reports including the collected data (e.g., metrics, measurements, statuses, statistics, other information, etc.) to network entities, such as a NWDAF.

While Third Generation Partnership Project (3GPP) specifications, specifically those related to 5GS network implementation support data (e.g., metrics, measurements, statuses, statistics, other information, etc.) collection and reporting, the 3GPP specifications currently lack an adequate framework to determine the level of access to the collected data (e.g., metrics, measurements, statuses, statistics, other information, etc.).

Currently, the level at which the collected information can be accessed by the different network functions is undefined. For example, there is currently no mechanism for an AP (e.g., a service or application provider) to limit or control the data that other entities can request related to the provisioning of a service or application over a 5GS network. As a specific example, there is currently no mechanism to define that the NWDAF should only be able to access the average rebuffering events per hour over all sessions instead of on a per UE/session statistics. Additionally, the 3GPP specifications currently lack an adequate framework to define privacy. The Application Provider (AP) wants to protect the privacy of their users and the AP doesn't want to expose service-specific details, but there is no current mechanism to institute such privacy controls for collected data (e.g., metrics, measurements, statuses, statistics, other information, etc.).

Various embodiments include methods and devices for media application function (AF) exposure functionality. Various embodiments include methods for controlling access to logs associated with a service or application performed by a processor of an application function (AF) server of a fifth generation (5G) system (5GS). In various embodiments, an AF server may be configured to define a set of event types and respective parameters that can be logged and/or reported for sessions of a service or application. In various embodiments, one or more exposure levels (or access levels) may be associated with the event types and parameters. In various embodiments, a processor of an Application Provider (AP) server may define a set of aggregation rules for each event type and its respective parameters at each of the one or more exposure levels. The AP server may indicate the event types and parameters, the one or more exposure levels, and the aggregation rules to the AF server. In various embodiments, for each event type and parameters and each of the defined levels, one or more aggregation functions, aggregation periods, and/or aggregation groups may be defined. As examples, the aggregation dimensions may include, user, session, and/or time. Various embodiments may provide a method that preserves user and service privacy by allowing differentiated access to service and application logged data and statistics. Various embodiments may be compatible with the AF exposure framework and/or compatible with the 5GMS architecture. Various embodiments may enable a list of the parameters and an indication of how the parameters are aggregated to be generated.

The NWDAF may enable data collection and exposure of metrics within a 5GS network. The NWDAF may be a core network (CN) function for data collection, data analytics, and data exposure. The NWDAF may receive data collected by various network functions (NFs) of a 5G core network (5GCN), such as application functions (AFs), access and mobility functions (AMFs), session management functions (SMFs), policy control functions (PCFs), user data repositories (UDRs), network exposure functions (NEFs), Operations, Administration and Maintenances (OAMs), etc. The NWDAF may support data exposure by providing on demand analytics to NFs. The interface between NWDAF and AF may be a direct interface or go through the network exposure function (NEF).

The NWDAF, or other entities, may request some input data from an AF for data analytics which may trigger the AF to collect and/or report data (e.g., metrics, measurements, statuses, statistics, other information, etc.) from a wireless device. AFs may provide a standardized interface for an AF to expose events about applications or services. For example, "Naf_EventExposure_Subscribe/Unsubscribe/Notify" operations may implement a subscribe/notify framework. The exposed events may include specified event types and associated one or more parameters with those event types. Example event types and include: "SVC_EXPERI-ENCE" for service data for an application; "UE_MOBIL-ITY" for user equipment (UE) mobility information; "UE_COMM" for UE communication information; and "EXCEPTIONS" for exception information. There may be three types of event notification methods, include periodic, one time, and on event detection. An entity, such as the NWDAF, AP, etc., may subscribe for event exposure to an AF and the AF may reply to the subscription with a listing of the supported event types and parameters. After being subscribed to the AF, the entity, such as the NWDAF, AP, etc., may request periodic notifications (or reporting) associated with one or more available events, on demand (e.g., one time) notification (or reporting) associated with one or more available events, and/or automatic (e.g., on event detection/occurrence) notification (or reporting) from the AF. The AF may provide the requested data (e.g., metrics, measurements, statuses, statistics, other information, etc.) to the entity, such as the NWDAF, AP, etc., in the form of logs reports including the data (e.g., metrics, measurements, statuses, statistics, other information, etc.).

Various embodiments may enable an AP server to control the subscriptions to the logs of data (e.g., metrics, measurements, statuses, statistics, other information, etc.) collected for a service or application by an AF server. The AP server may generate an access configuration message for the service or application including an indication of one or more event types and parameters, one or more exposure levels, and one or more aggregation rules. The access configuration message may indicate event types and/or parameters the AP server is authorizing the AF to enable entities to subscribe to for receiving logs of collected data (e.g., metrics, measurements, statuses, statistics, other information, etc.) of the service or application.

The exposure levels (or access levels) may be different stratified levels of access the AP server is granting to other entities. Multiple different exposure levels (or access levels) may be associated with event types and/or parameters. For example, 1, 2, 3, 4, or more exposure levels (or access levels) may be indicated. Each access level (or exposure level) may be associated with one or more aggregation rules applicable to that access level (or exposure level).

Aggregation rules may define the level of granularity at which data (e.g., metrics, measurements, statuses, statistics, other information, etc.) may be provided to an entity associated with a specific exposure level (or access level). Specifically, aggregation rules may define the level of granularity of logs of data (e.g., metrics, measurements, statuses, statistics, other information, etc.) that may be provided to an entity associated with a specific exposure level (or access level). By configuring the aggregation rules, the AP server may configure specific data (e.g., metrics, measurements, statuses, statistics, other information, etc.) collection settings for other entities and/or the composition of logs of the data received by the other entities based on the exposure (or access) level assigned to that other entity. Aggregation rules may define the user aggregation (or anonymization) efforts that must be applied before the data (e.g., metrics, measurements, statuses, statistics, other information, etc.) can be reported, such as none, averaging of user data, summing of user data, etc. Aggregation rules may define the time aggregation (or anonymization) efforts that must be applied before the data (e.g., metrics, measurements, statuses, statistics, other information, etc.) can be reported, such as none, averaging of time periods, summing of time periods, etc. Aggregation rules may define the session aggregation (or anonymization) efforts that must be applied before the data (e.g., metrics, measurements, statuses, statistics, other information, etc.) can be reported, such as none, averaging of a session, summing of sessions, etc. Aggregation rules may define that all user data may be available per user or aggregation rules may define the grouping required for user data to further limit (or anonymize) the user data before reporting to the other entity, such as by limiting the reporting to be over a time period, to users in a location, to a user group, by a content identifier (ID), by a subscription type, etc.

In various embodiments, while an AP may be provided full access to the user data of the users consuming the service, the AP may limit other entities, such as the NWDAF, etc., to only the access level the AP assigns and therefore restrict the data available to the other entities. For example, an AP that is a movie streaming subscription service (e.g., Netflix®, AppleTV®, etc.) may not want to expose information on users and/or on specific content that specific subscribers are watching at a given time to the NWDAF and the AP may set the exposure level (or access level) of the NWDAF and the aggregation rules for that exposure level such that the NWDAF cannot receive collected information identifying specific content specific users are watching at a given time. Further, an AP may only want to expose information on a subscription service or subscription type (or level) basis, rather than a per-user basis. For example, the AP may set the aggregation group to a subscription type, such as "premium", "basic", "free", "trial", etc. to distinguish among users based on subscription type or level. As another example, the AP may set the aggregation group to particular subscription services (e.g., Netflix®, AppleTV®, etc.) to distinguish among users paying for and accessing particular subscription streaming services. In this manner, the AP may enable the NWDAF to collect information on certain types of subscribers (e.g., "trial") and/or subscription services (e.g., Netflix®, AppleTV®, etc.) while restricting collection of information for other subscription types (e.g., "premium") and/or other subscription services. Similarly, some applications may be or include subscription features, in which case the AP may enable the NWDAG to collect information on certain types of application subscribers.

As an example implementation of various embodiments, an event type may be QoE and a parameter may be a rebuffering (also referred to simply as a rebuffering event) and three access levels, Access Level 1, Access Level 2, and Access Level 3 may be defined for the rebuffering event parameter. Access Level 1 may be associated with rules including that no aggregation over time or users. A caller can access all events from all users as they happen. The indication may be "NONE" for users of "NONE" per session meaning no aggregation over time or users is required and each user separately and each user event as they occur can be reported. The Access Level 1 may also have all permissions/functions of lower levels. Access Level 2 may have the aggregation function NONE for users (i.e. for each user separately) and of COUNT per session. The Access Level 2 may also have all permissions/functions of lower levels. The Access Level 3 may have the aggregation function AVERAGE over all users and of AVERAGE per sessions over COUNT per session hour. In this manner, the different access levels may be used to generate different logs of collected data (e.g., metrics, measurements, statuses, statistics, other information, etc.).

In various embodiments, the event type may be associated with one or more parameters. In some embodiments, the parameters may include content hosting event type parameters, Quality of Service (QoS)/charging and network assistance event type parameters, consumption event type parameters, and/or Quality of Experience (QoE) event type parameters. As an example, a content hosting event type may include the parameters: Downlink bytes; Origin bytes; Transfer rate; Cache Hit; Cache Miss; Request; Successful response; and/or Erroneous response. As an example, a QoS/Charging and Network Assistance event type may include the parameters: QoS Profile Activation; QoS Profile Deactivation; Maximum Bitrate Downlink/Uplink; Guaranteed Bitrate Downlink/Uplink; Guaranteed Packet Loss Ratio (PLR) Downlink/Uplink; Guaranteed Latency; and/or Sponsor identifier (Id). As an example, the consumption event type may include parameters: Session Activation; Session Termination; Location; Entry point Uniform Resource Locator (URL) or Session or Content Identifier. As an example, the QoE event type may include parameters: Application Provider defined QoE metrics; AF only performs requested aggregation; and/or Extensible schema for QoE parameters with associated aggregation functions.

In some embodiments, the event types and/or the parameters associated with the event types may be associated with periodic wireless device reported data (e.g., data reported every 5 seconds, etc.), on demand reported wireless device data (e.g., data reported in response to a reporting request), and/or event based wireless device data (e.g., data reported when an event occurs, such as session start, stop, etc.).

In some embodiments, aggregation functions may be provided as an indexed table. In some embodiments, the aggregation functions may include a COUNT function, an AVERAGE function, a MEDIAN function, a MINIMUM function, a MAXIMUM function, and/or a SUM function.

While various examples are discussed herein in terms of event types and associated parameters, event types and parameters are merely one example of schema by which data (e.g., metrics, measurements, statuses, statistics, other information, etc.) collection operations may be defined used to illustrate the various embodiments. Event types by themselves or parameters by themselves may be associated with exposure levels (or access levels) and such singular event types or parameters may be substituted in the various examples. Additionally, while various levels of user data are discussed herein, the level of user identification and/or anonymization may be different in different networks, for example based on local laws or policies where the network may be located. As such, full access to user data as discussed herein may mean full access to the level of detail of user data authorized by local laws or policies.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122. The core network 140 may be connected to other devices, such as Application Provider (AP) server 141. In this manner, via the connections to the core network 140, the AP server 141 may make services or applications, such as 5GMS services or applications, available to wireless devices 120*a-e* (e.g., from the core network 140 via the link 126 and from the base stations 110*a*-110*d* via the link 122).

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120*a-e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 2:
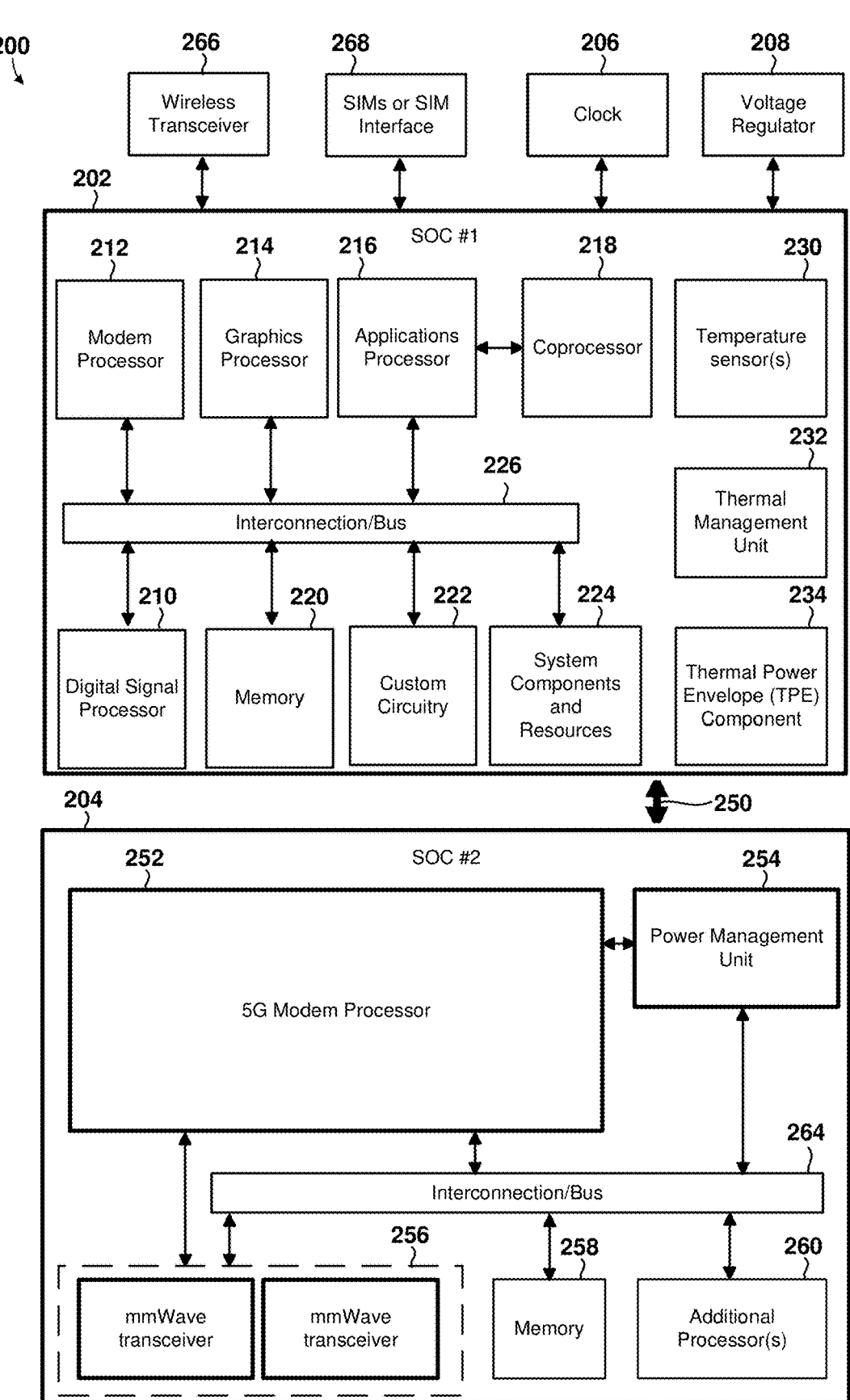
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, at least one SIM 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example SIP 200 discussed above, various embodiments may be implemented in a wide variety of computing systems, which may include a single processor, multiple processors, multicore processors, or any combination thereof.

Figure 3:
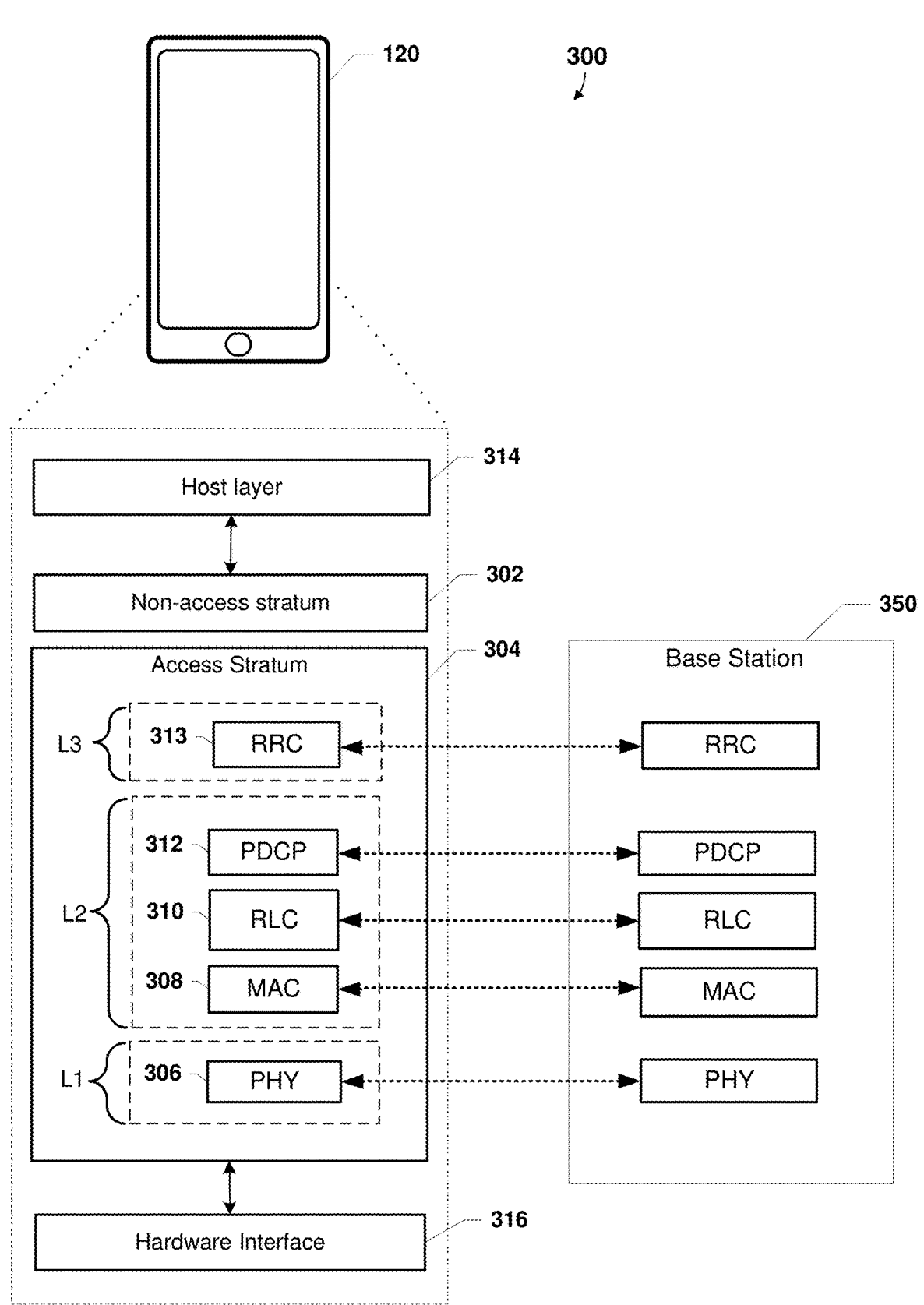
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 120 may implement the software architecture 300 to facilitate communication between a wireless device 120 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 120 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
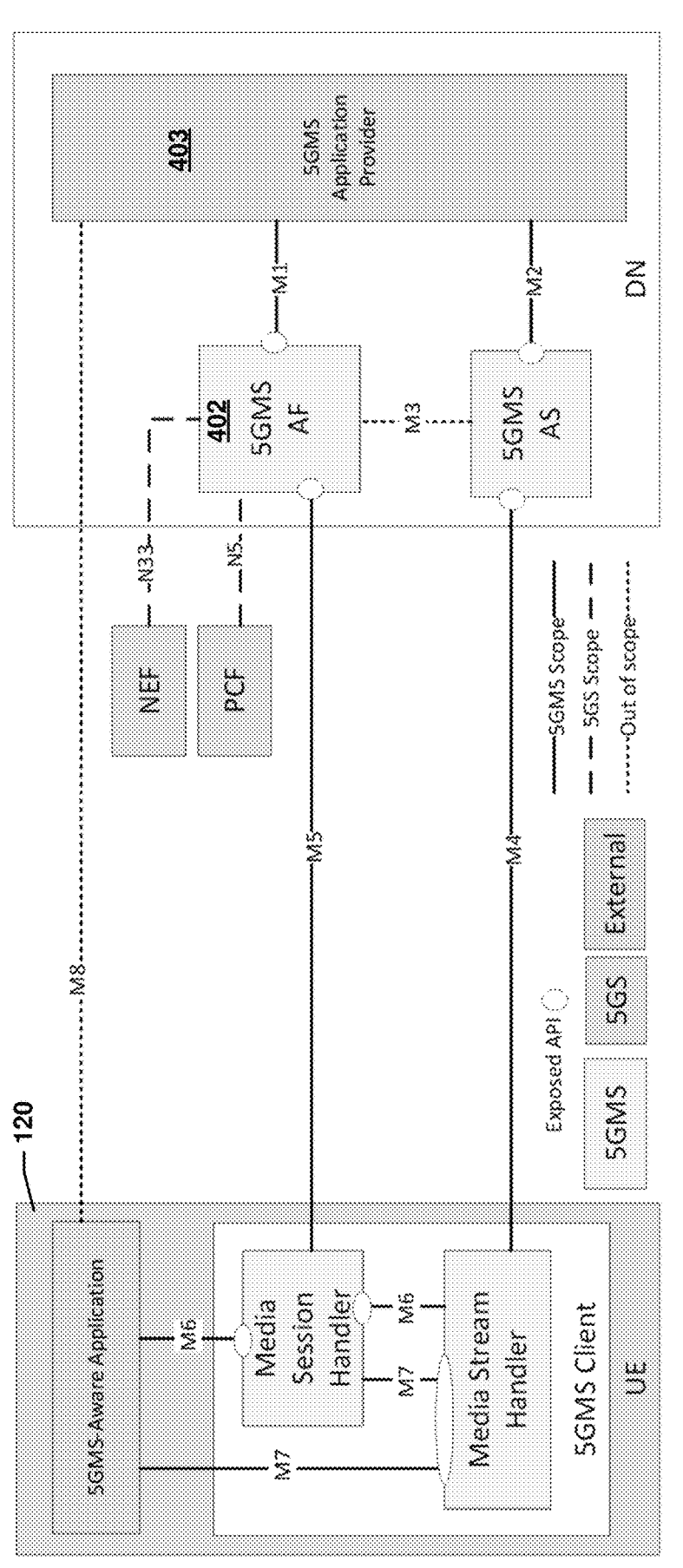
FIG. 4A is an architecture diagram illustrating interactions and interfaces for 5G Media Streaming between an applications function (AF) server and wireless device in accordance with various embodiments.

FIG. 4A is an architecture diagram illustrating interactions and interfaces for 5G Media Streaming (5GMS) between an applications function (AF) server 402 and wireless device 120 in accordance with various embodiments. With reference to FIGS. 1-4A, FIG. 4 illustrates example interfaces for 5GMS service provisioning. For example, the 5GMS architecture allows an application provider (AP) server 403 (e.g., AP server 141) to provision services to wireless devices (e.g., user equipments (UEs)), such as wireless device 120 over the M1 interface. The AP server 403 interacts with the AF server 402 to provision the service and the AF server 402 interacts with the media session handler on the wireless device 120 to provide the service to the wireless device 120 and receive data (e.g., metrics, measurements, statuses, statistics, other information, etc.) reported from the wireless device 120, such as data associated with consuming the service. Provisioning may include various parameters defined by the AP and/or network, such as content hosting, QoS templates, consumption and QoE reporting, and charging policies. The network may collect data (e.g., metrics, measurements, statuses, statistics, other information, etc.) about the service from the wireless devices consuming the service. For example, the wireless devices consuming the service may send reports to the network including data (e.g., metrics, measurements, statuses, statistics, other information, etc.) about their consumption of the service. The AP server 403 (e.g., a service or application provider) may receive collected data (e.g., metrics, measurements, statuses, statistics, other information, etc.) about the service, such as data associated with ongoing and past sessions, etc. The AF server 402 may share collected data (e.g., metrics, measurements, statuses, statistics, other information, etc.) among network entities, such as with a Network Data Analytics Function (NWDAF). For example, the AF server 402 may send logs of the collected data (e.g., metrics, measurements, statuses, statistics, other information, etc.) via logs reports to the network entities, such as the NWDAF.

Figure 4B:
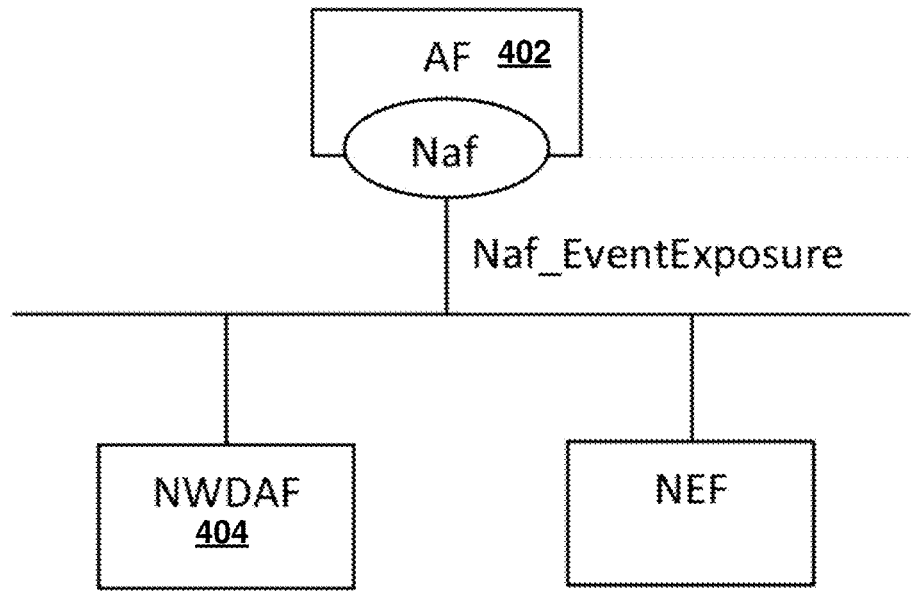
FIG. 4B is an architecture diagram illustrating AF exposure interactions in a 5G system.

FIG. 4B is an architecture diagram illustrating AF exposure interactions in a 5G system. With reference to FIGS. 1-4B, the NWDAF 404 may request some input data from an AF server 402 for data analytics which may trigger the AF 402 to collect data (e.g., metrics, measurements, statuses, statistics, other information, etc.) from a wireless device (e.g., wireless device 120, 120a-e, 200). AF servers, such as AF server 402, may provide a standardized interface for AF to expose events about applications or services. For example, "Naf_EventExposure_Subscribe/Unsubscribe/Notify" operations may implement a subscribe/notify framework. Example event types include: "SVC_EXPERIENCE" for service data for an application; "UE_MOBILITY" for UE mobility information; "UE_COMM" for UE communication information; and "EXCEPTIONS" for exception information. There may be three types of event notification methods, include periodic, one time, and on event detection. An entity, such as the NWDAF 404, may subscribe to the AF server 402 to receive logs from the AF server 402, such as logs of collected data (e.g., metrics, measurements, statuses, statistics, other information, etc.).

Figure 4C:
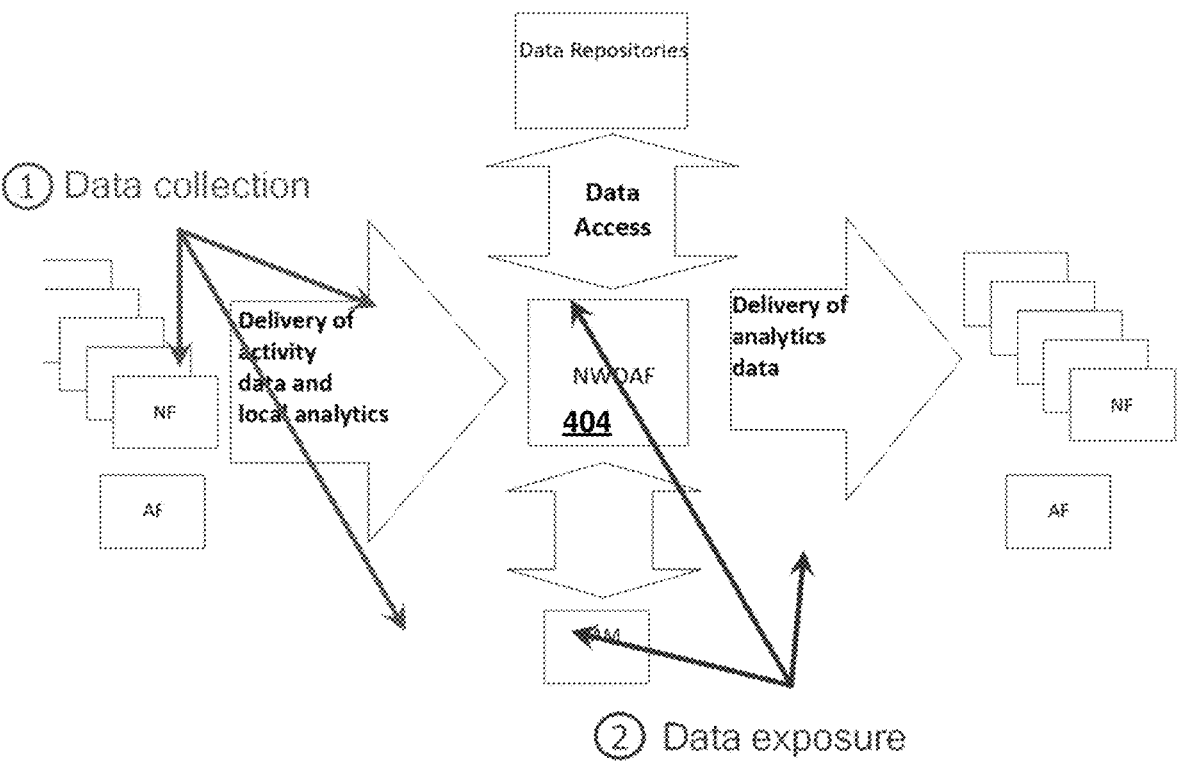
FIG. 4C is an architecture diagram illustrating Network Data Analytics Function (NWDAF) interactions in a 5G core network.

FIG. 4C is an architecture diagram illustrating Network Data Analytics Function (NWDAF) interactions in a 5G core network. With reference to FIGS. 1-4C, the NWDAF 404 may enable data collection and exposure of metrics within a 5GS network. The NWDAF 404 may be a core network (CN) function for data collection, data analytics, and data exposure. The NWDAF 404 may receive data collected by various network functions (NFs) of a 5G core network (5GCN), such as application functions (AFs) (e.g., AF server 402), access and mobility functions (AMFs), session management functions (SMFs), policy control functions (PCFs), user data repositories (UDRs), network exposure functions (NEFs), Operations, Administration and Maintenances (OAMs), etc. The NWDAF 404 may support data exposure by providing on demand analytics to NFs. The interface between NWDAF 404 and AF server 402 may be a direct interface or go through the NEF.

FIG. 5A is a process flow diagram illustrating a method 500 for controlling access to logs associated with a service or application in accordance with various embodiments. With reference to FIGS. 1-5A, the operations of method 500 may be implemented by a processor of a network computing device, such as an AP server (e.g., AP server 141, 403). The operations of method 500 may enable an AP server to control access to logs associated with a service or application provisioned over a 5GS network. As an example, the operations of method 500 may be performed for an uplink 5G Media Streaming Service and/or a downlink 5G Media Streaming Service.

In block 502, the processor may perform operations including determining one or more event types and parameters to be enabled for information exposure for a service or application. In various embodiments, the one or more event types may include content hosting event types, Quality of Service (QoS)/charging and network assistance event types, consumption event types, and/or Quality of Experience (QoE) event types. As an example, a content hosting event type may include the parameters: Downlink bytes; Origin bytes; Transfer rate; Cache Hit; Cache Miss; Request; Successful response; and/or Erroneous response. As an example, a QoS/Charging and Network Assistance event type may include the parameters: QoS Profile Activation; QoS Profile Deactivation; Maximum Bitrate Downlink/Uplink; Guaranteed Bitrate Downlink/Uplink; Guaranteed Packet Loss Ratio (PLR) Downlink/Uplink; Guaranteed Latency; and/or Sponsor identifier (Id). As an example, the consumption event type may include parameters: Session Activation; Session Termination; Location; Entry point Uniform Resource Locator (URL) or Session or Content Identifier. As an example, the QoE event type may include parameters: Application Provider defined QoE metrics; AF only performs requested aggregation; and/or Extensible schema for QoE parameters with associated aggregation functions.

In block 504, the processor may perform operations including determining one or more exposure levels for the service or application. The exposure levels (or access levels) may be different stratified levels of access the AP server is granting to other entities. Multiple different exposure levels (or access levels) may be associated with event types and/or parameters. For example, 1, 2, 3, 4, or more exposure levels (or access levels) may be indicated. Each access level (or exposure level) may be associated with one or more aggregation rules applicable to that access level (or exposure level).

In block 506, the processor may perform operations including determining aggregation rules for each of the one or more event types and parameters at each of the one or more exposure levels. In various embodiments, the aggregation rules include aggregation functions, aggregation periods, and/or aggregation groups for the service or application. In some embodiments, the aggregation functions may include one or more of a COUNT function, an AVERAGE function, a MEDIAN function, a MINIMUM function, a MAXIMUM function, and/or a SUM function. In some embodiments, the aggregation periods may include a session or a time period. In some embodiments, the aggregation groups may include users individually, user groups, user locations, a content identifier, subscription type, or all users together. In some embodiments, the metrics aggregation rules may be determined on a per exposure level basis such that different exposure levels may be associated with different aggregation rules. In some embodiments, the aggregation rules may be based on subscriptions sold to the collected data offered by the AP. For example, different subscription levels may support different aggregation groups with entities having a subscription for data with the AP being able to get data on individual users (though potentially anonymized) and entities not having a subscription for data with the AP being able to only get data averaged or summed at the user level. In this manner, entities having a subscription with the AP may have higher or more granular access to aggregation groups than those not having a subscription with the AP.

In block 508, the processor may perform operations including generating an access configuration message for the service or application, the access configuration message including an indication of the one or more event types and parameters, the one or more exposure levels, and the aggregation rules. The access configuration message may correlate an event type with one or more parameter. The access configuration message may correlate the indicated event type and/or parameter(s) with one or more access levels. The one or more access levels may each be correlated with their own respective aggregation rules in the access configuration message. In some embodiments, the access configuration message may include authentication information for the access levels, such as a uniform resource locator (URL) of an authentication server.

In block 510, the processor may perform operations including sending the access configuration message to an application function (AF) server. For example, the access configuration message may be sent to the AF server via the M1 interface.

FIG. 5B is an example schema of an access configuration message 550 in accordance with various embodiments. With reference to FIGS. 1-5B, the access configuration message 550 may be an access configuration message generated according to the operations of method 500 (FIG. 5A). The access configuration message 550 may include an indication of one or more event types 552. The access configuration message 550 may include an indication of one or more parameters 554. The access configuration message 550 may include an indication of one or more access levels 556. The access configuration message 550 may include an indication of one or more aggregation rules, such as an indication of one or more aggregation functions 558 and one or more aggregation groups 560. The access configuration message 550 may include an indication of authorization information 562.

As a non-limiting example, the event type 552 may be a hosting event type and the parameter 554 may be "Downlink_bytes". In this manner, the access configuration message 550 may represent data (e.g., metrics, measurements, statuses, statistics, other information, etc.) reporting configuration settings from the AP server (e.g., AP server 141, 403) to the AF server (141, 402) governing how the AF server (141, 402) is to provide logs of data (e.g., metrics, measurements, statuses, statistics, other information, etc.) for a service to a requesting entity.

In this non-limiting example, the access configuration message 550 may define three access levels 556, Level "1", Level "2", and "Default". In this example, the aggregation functions 558 may define that for Level "1": aggregation of user information may be not applied ("None")(e.g., individual user granularity is allowed for level "1"), aggregated over an average of all users ("average"), or aggregated as a sum of all users ("sum"); aggregation of time information may be not applied ("None")(e.g., granularity as to any time period is allowed for level "1") or aggregated as a sum of all times ("sum"); and aggregation of session information may be not applied ("None")(e.g., individual session granularity is allowed for level "1"), aggregated over an average of sessions ("average"), or aggregated as a sum of all sessions ("sum"). In some implementations, the ability to use the different granularity levels, such as "None", "Average", or "Sum" may be controlled by a subscription between the entity requesting data and the AP server generating the access configuration message such that even though an entity may be a level "1" entity, an additional subscription with the AP server may be required to enable individual granularity for level "1" and level "1" entities without the additional subscription may only receive "average" or "sum" based logs. In this example, the aggregation functions 558 may define that for Level "2": aggregation of user information may be aggregated over an average of all users ("average") or aggregated as a sum of all users ("sum"); aggregation of time information may be not applied ("None")(e.g., granularity as to any time period is allowed for level "2") or aggregated as a sum of all times ("sum"); and aggregation of session information may be aggregated over an average of sessions ("average") or aggregated as a sum of all sessions ("sum"). In this example, the aggregation functions 558 may define that for Level "Default": aggregation of user information may be aggregated over an average of all users ("average") or aggregated as a sum of all users ("sum"); aggregation of time information may be aggregated as a sum of all times ("sum"); and aggregation of session information may be aggregated as a sum of all sessions ("sum").

In this non-limiting example, the access configuration message 550 may define aggregation groups 560 for each of the three access levels 556, Level "1", Level "2", and "Default". For level "1" any grouping of users/user data may be allowed (e.g., "All"). For level "2" a group of users/user data by time period, location, user group, or content ID may be allowed. For level "Default" a group of users/user data by time period and user group may be allowed.

In this non-limiting example, the access configuration message 550 may define authorization information 562 for each of the three access levels 556, Level "1", Level "2", and "Default". For level "1" a URL for an authorization server may be provided. The URL may be an address of a server to which subscription and/or reporting requests may be redirected by an AF server to authenticate and/or validate an access level (or exposure level) for an entity. The URL may point to the AP server itself (e.g., AP server 141, 403) or another entity, such as a third party authentication server. For level "2" a URL for an authorization server is provided. The URL may be an address of a server to which subscription and/or reporting requests may be redirected by an AF server to authenticate and/or validate an access level (or exposure level) for an entity. The URL may point to the AP server itself (e.g., AP server 141, 403) or another entity, such as a third party authentication server. For level "Default", no authentication ("None") may be required (or performed).

The access configuration message 550 of FIG. 5B is merely one example of a schema for supporting AF exposure functionality and other access configuration message structures and elements may be substituted in the various embodiments. In some embodiments, other access configuration messages may include more event types, or may not indicate event types. In some embodiments, other access configuration messages may include multiple parameters, or may not indicate parameters. In some embodiments, other access configuration messages may include more or less exposure levels. In some embodiments, a default exposure level may not be defined such that entities without an access level assigned may not receive any logs of data for a service. In some embodiments, other access configuration messages may include more or less aggregation rules. In some embodiments, other access configuration messages may not include authorization information.

Figure 6A:
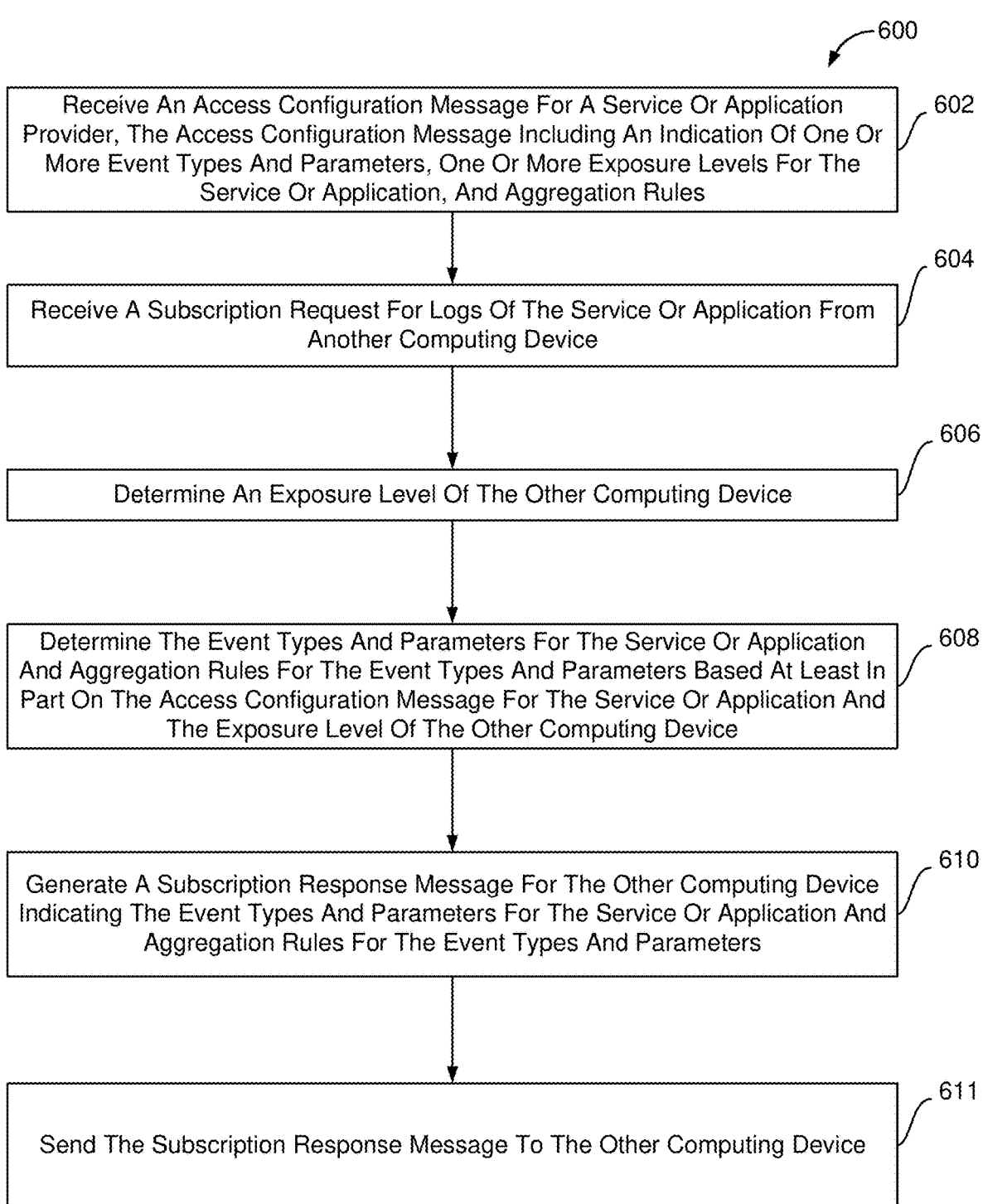
FIG. 6A is a process flow diagram illustrating a method for controlling access to logs associated with a service or application in accordance with various embodiments.

FIG. 6A is a process flow diagram illustrating a method 600 for controlling access to logs associated with a service or application in accordance with various embodiments. With reference to FIGS. 1-6A, the operations of method 600 may be implemented by a processor of a network computing device, such as an AF server (e.g., 402). As an example, the operations of method 600 may be performed for an uplink 5G Media Streaming Service and/or a downlink 5G Media Streaming Service. In various embodiments, the operations of method 600 may be performed in conjunction with the operations of method 500 (FIG. 5A).

In block 602, the processor may perform operations including receiving an access configuration message from a service or application provider, the access configuration message including an indication of one or more event types and parameters, one or more exposure levels, and aggregation rules for a service or application. In various embodiments, the access configuration message may be received from an AP server (e.g., AP server 141, 403). For example, the access configuration message may be received via the M1 interface. In some embodiments, the access configuration message may be an access configuration message generated by an AP server according to the operations of method 500 (FIG. 5A). As In some embodiments, the access configuration message may be access a configuration message 550 as described with reference to FIG. 5B.

In block 604, the processor may perform operations including receiving a subscription request for logs of the service or application from another computing device. In some embodiments, the subscription request may be a network application function (NAF) event exposure subscription, such as a "Naf_MetricsInfo_Subscribe" request, received from a NWDAF (e.g., NWDAF 404). The logs of the service may be logs of reported or collected data (e.g., metrics, measurements, statuses, statistics, other information, etc.) of the service or application received from wireless devices consuming the service or application.

In block 606, the processor may perform operations including determining an exposure level of the other computing device. In some embodiments, the exposure level (or access level) may be indicated by the other computing device. For example, the other computing device may indicate an access level in the subscription request. In some embodiments, the exposure level (or access level) may be indicated by a type of the other computing device. For example, an AP server may be associated with a specific access level, such as Level "1", a NWDAF may be associated with a different specific access level, such as Level "2", and other entities may be associated with a default access level, such as "Default".

In some embodiments, the exposure level (or access level) may be determined as part of an authentication process for the subscribing computing device. Authentication may occur in any manner, and as part of the authentication, the exposure level (or access level) may be indicated to the AF server and/or determined by the AF server. In some embodiments, a subscribing entity may be redirected by the AF server to the AP server or another authentication server to be authenticated and receive a token associated with the exposure level (or access level) assigned to the subscribing entity. In some embodiments, the subscribing entity may provide its token to the AF server and based on the token, the AF server may determine the exposure level (or access level) of the subscribing entity.

In block 608, the processor may perform operations including determining the event types and parameters for the service or application and aggregation rule for the event types and parameters based at least in part on the access configuration message for the service or application and the exposure level of the other computing device. In some embodiments, the processor may parse the access configuration message to determine all event types and parameters for the service having the exposure level (or access level) of the subscribing entity and may determine the aggregation rules associated with those event types and parameters at the exposure level (or access level) of the subscribing entity.

In block 610, the processor may perform operations including generating a subscription response message for the other computing device indicating the event type and parameters for the service or application and aggregation rules for the event types and parameters. In some embodiments, the subscription response message may be a listing of all authorized event types and parameters for the exposure level (or access level) of the subscribing entity and the aggregation rules to follow for each of the event types and parameters. In this manner, the subscription response message may indicate the processing rules and available event types and parameters for only the event types and parameters available for the access level assigned to the subscribing entity.

In block 611, the processor may perform operations including sending the subscription response message to the other computing device. In some embodiments, the subscription response message may be sent in a NAF response, such as "Naf_MetricsProcessingRules_Provision".

Figure 6B:
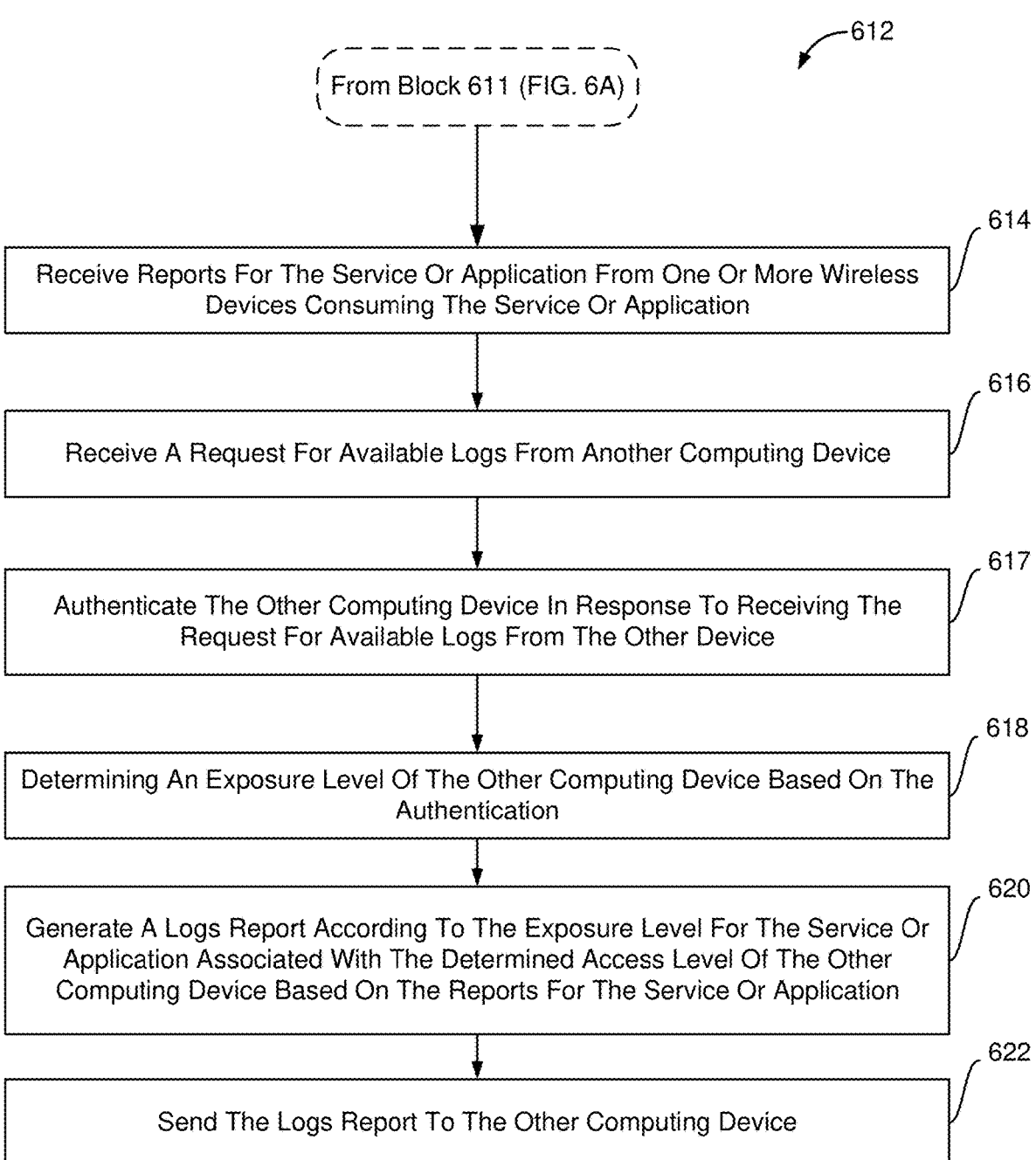
FIG. 6B is a process flow diagram illustrating a method for controlling access to logs associated with a service or application in accordance with various embodiments.

FIG. 6B is a process flow diagram illustrating a method 612 for controlling access to logs associated with a service or application in accordance with various embodiments. With reference to FIGS. 1-6B, the operations of method 612 may be implemented by a processor of a network computing device, such as an AF server (e.g., 402). As an example, the operations of method 612 may be performed for an uplink 5G Media Streaming Service and/or a downlink 5G Media Streaming Service. In some embodiments, the operations of method 612 may be performed in conjunction with the operations of methods 500 (FIG. 5A) and/or 600 (FIG. 6A). As one optional example, the operations of method 612 may be performed in response to sending the subscription response message to the other computing device in block 611 of method 600 (FIG. 6A).

In block 614, the processor may perform operations including receiving reports for the service or application from one or more wireless devices consuming the service or application. The reports may include data (e.g., metrics, measurements, statuses, statistics, other information, etc.) associated with the consumption of the service or application by the one or more wireless device.

In block 616, the processor may perform operations including receiving a request for available logs from another computing device. In some embodiments, the other computing device may be a NWDAF server (e.g., NWDAF 404). The available logs may be logs of reported or collected data (e.g., metrics, measurements, statuses, statistics, other information, etc.) related to the consumption of the service or application received from the one or more wireless devices.

In block 617, the processor may perform operations including authenticating the other computing device in response to receiving the request for available logs from another device. In some embodiments, authenticating the other device may include verifying a token from the other device with the service or application provider. As part of authenticating the other computing device, the AF server may send an authorization request to the AP server (e.g., 141, 403) or may redirect the other computing device to send an authorization request to the AP server.

In block 618, the processor may perform operations including determining an exposure level (access level) of the other device based on the authentication. In some embodiments, the authentication may result in the exposure level (or access level) being indicated to the AF server. For example, an authentication message may indicate an assigned exposure (or access) level. As another example, a failure to authenticate the other computing device may indicate the other computing device is to be treated as having a default exposure (or access) level.

In block 620, the processor may perform operations including generating a logs report according to the exposure level for the service or application associated with the determined access level of the other computing device based on the reported data (e.g., metrics, measurements, statuses, statistics, other information, etc.) for the service or application. For example, the logs report may include one or more logs of collected data (e.g., metrics, measurements, statuses, statistics, other information, etc.) according to the exposure (or access) level of the other computing device and corresponding to the settings for event types and parameters at the exposure (or access) level as set by the AP server.

In block 622 the processor may perform operations including sending the logs report to the other device.

Figure 6C:
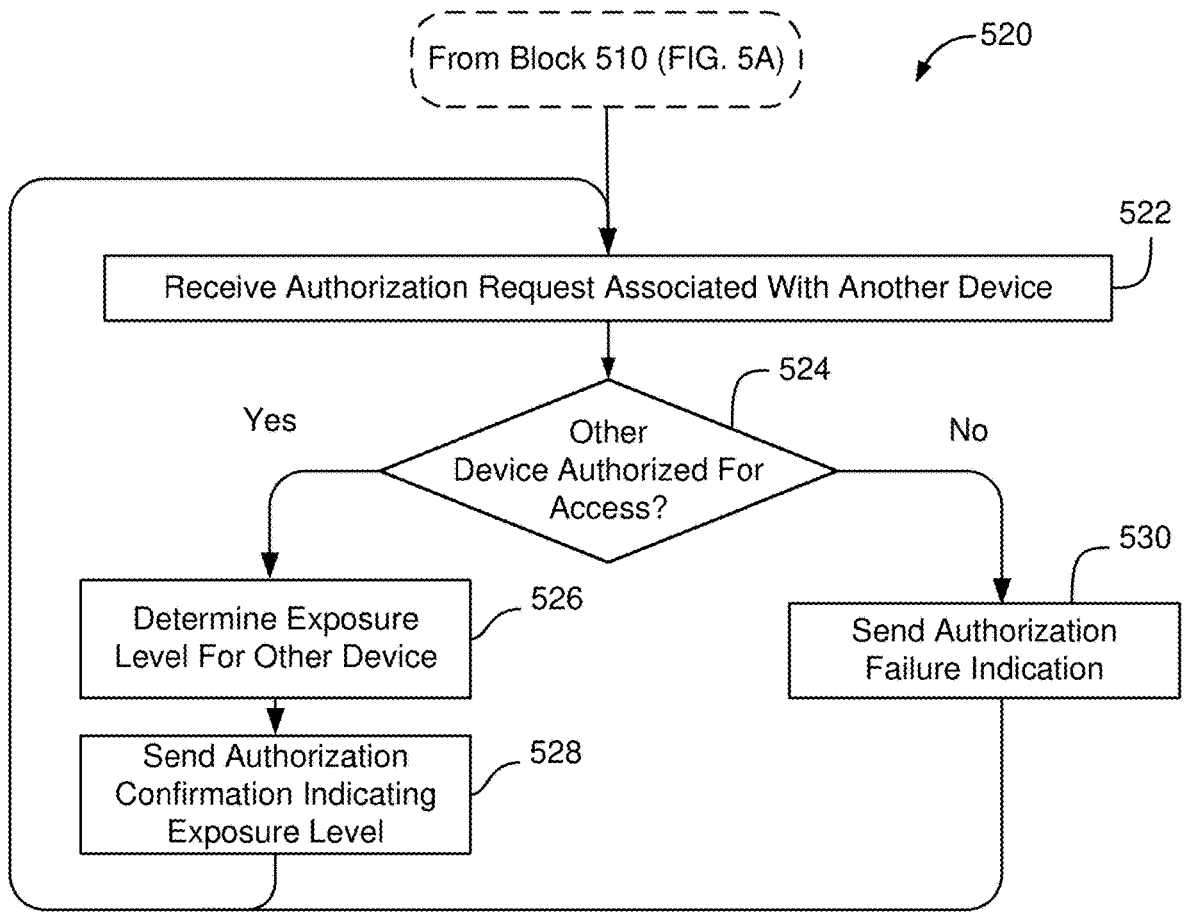
FIG. 6C is a process flow diagram illustrating a method for authorizing access to logs associated with a service or application in accordance with various embodiments.

FIG. 6C is a process flow diagram illustrating a method 520 for authorizing access to logs associated with a service or application in accordance with various embodiments. With reference to FIGS. 1-6C, the operations of method 520 may be implemented by a processor of a network computing device, such as an AP server (e.g., 141, 403). As an example, the operations of method 520 may be performed for an uplink 5G Media Streaming Service and/or a downlink 5G Media Streaming Service. In some embodiments, the operations of method 520 may be performed in conjunction with the operations of methods 500 (FIG. 5A), 600 (FIG. 6A), and/or 612 (FIG. 6B). In some embodiments, the operations of method 520 may be performed in response to sending the access configuration message to an AF server in block 510 of method 500 (FIG. 5A).

In block 522, the processor may perform operations including receiving an authorization request associated with another computing device. The authorization request may be a request from an AF server or the other computing device (e.g., a NWDAF). The authorization request may identify the other computing device.

In determination block 524, the processor may perform operations including determining whether the other computing device is authorized for access. In some embodiments, the AP server may determine whether the other computing device is associated with a third-party authorized for access to data (e.g., metrics, measurements, statuses, statistics, other information, etc.) of a service, a type of the other computing device, or any other attribute that may distinguish authorized devices from unauthorized devices.

In response to determining the device is not authorized (i.e., determination block 530="No"), the processor may perform operations including sending an authorization failure indication in block 530. The authorization failure indication may indicate the device is authorized for a default level of access to data (e.g., metrics, measurements, statuses, statistics, other information, etc.) for a service or may indicate the device is not authorized to receive any data for a service.

In response to determining the device is authorized (i.e., determination block 530="Yes"), the processor may perform operations including determining an exposure level for the other device in block 526. In some embodiments, the exposure level may be based on setting at the AP server, attributes of the other device, and/or service agreements.

In block 528, the processor may send an authorization confirmation indicating the exposure level. In some embodiments, the authorization confirmation may be a message sent to the AF server indicating the exposure level (or access level) assigned to the other computing device. In some embodiments, the authorization confirmation may be a message, such as a message including a token, sent to the other computing device.

Figure 7A:
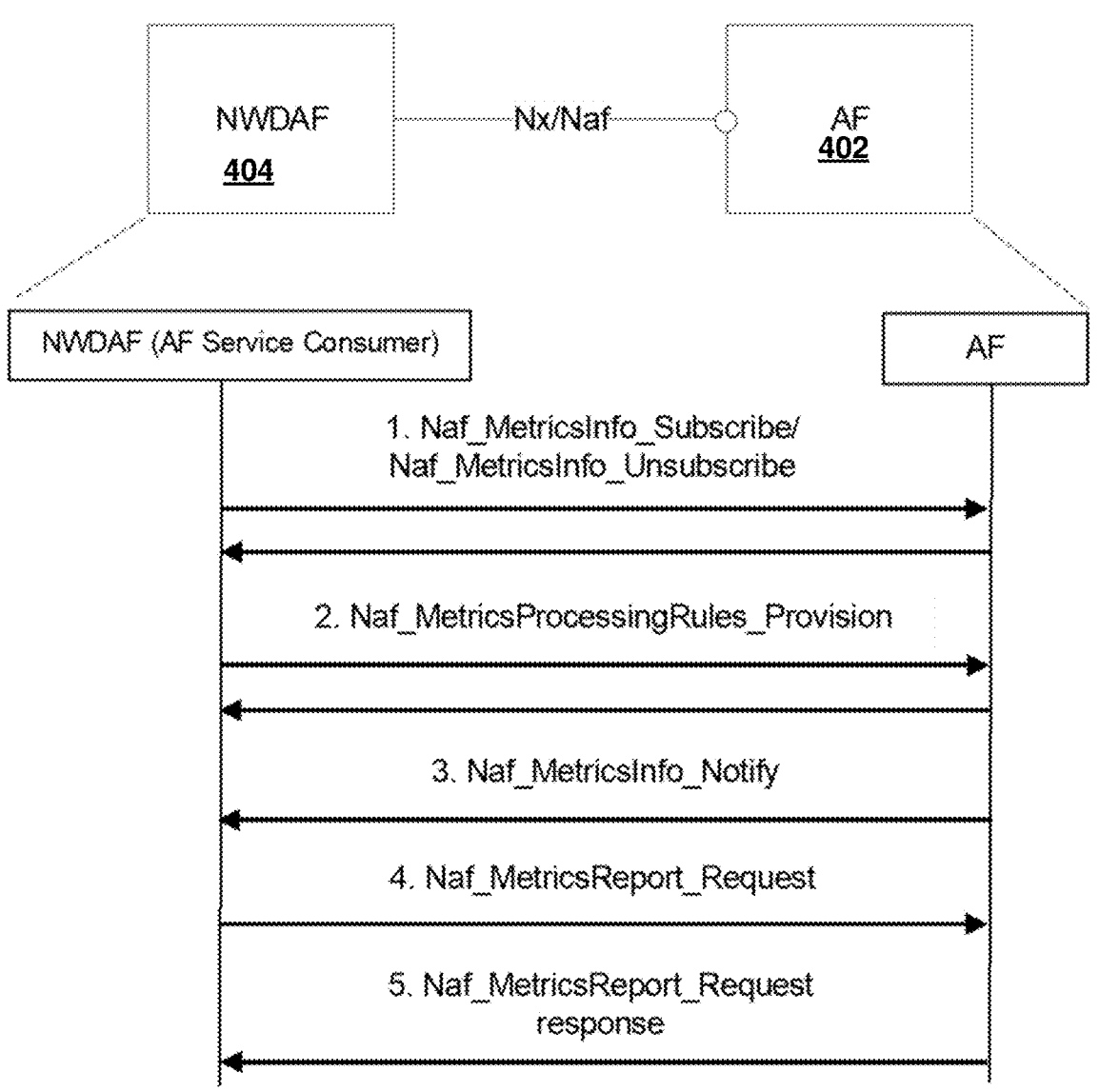
FIG. 7A is a call flow diagram illustrating interactions between an AF and NWDAF for logs delivery according to various embodiments.

FIG. 7A is a call flow diagram illustrating interactions between an AF and NWDAF for logs delivery according to various embodiments. With reference to FIGS. 1-7A, FIG. 7A may illustrate a Stage 2 (SA2 task) and Stage 3 (CT1 task) to specify a Nx reference point corresponding to a Naf service-based interface between an AF (e.g., AF server 402) and a NWDAF (e.g., NWDAF 404). In step 1, the NWDAF 404 may subscribe to the AF server 402 for reception of a data (e.g., metrics, measurements, statuses, statistics, other information, etc.) information notification. For example, the NWDAF 404 may send a Naf_MetricsInfo_Subscribe message to the AF server 402. In step 2, the AF server 402 may provision the event types and parameters for the exposure level (access level) of the NWDAF 404 to the NWDAF 404 according to the post-processing rules regarding data (e.g., metrics, measurements, statuses, statistics, other information, etc.). For example, the AF server 402 may indicate the available logs according to the exposure level (or access level) of the NWDAF 404. In step 3, an AF server 402 may send notification to the NWDAF 404 of newly-available data information available (e.g., newly available logs). In step 4, a request by the NWDAF 404 to the AF server for delivery of logs reports generated in accordance with the processing rules according to various embodiments may be sent. In step 5, a response from the AF server 402 to the NWDAF 404 may be sent delivering the requested logs report according to the aggregation rules for the exposure level of the NWDAF 404.

Figure 7B:
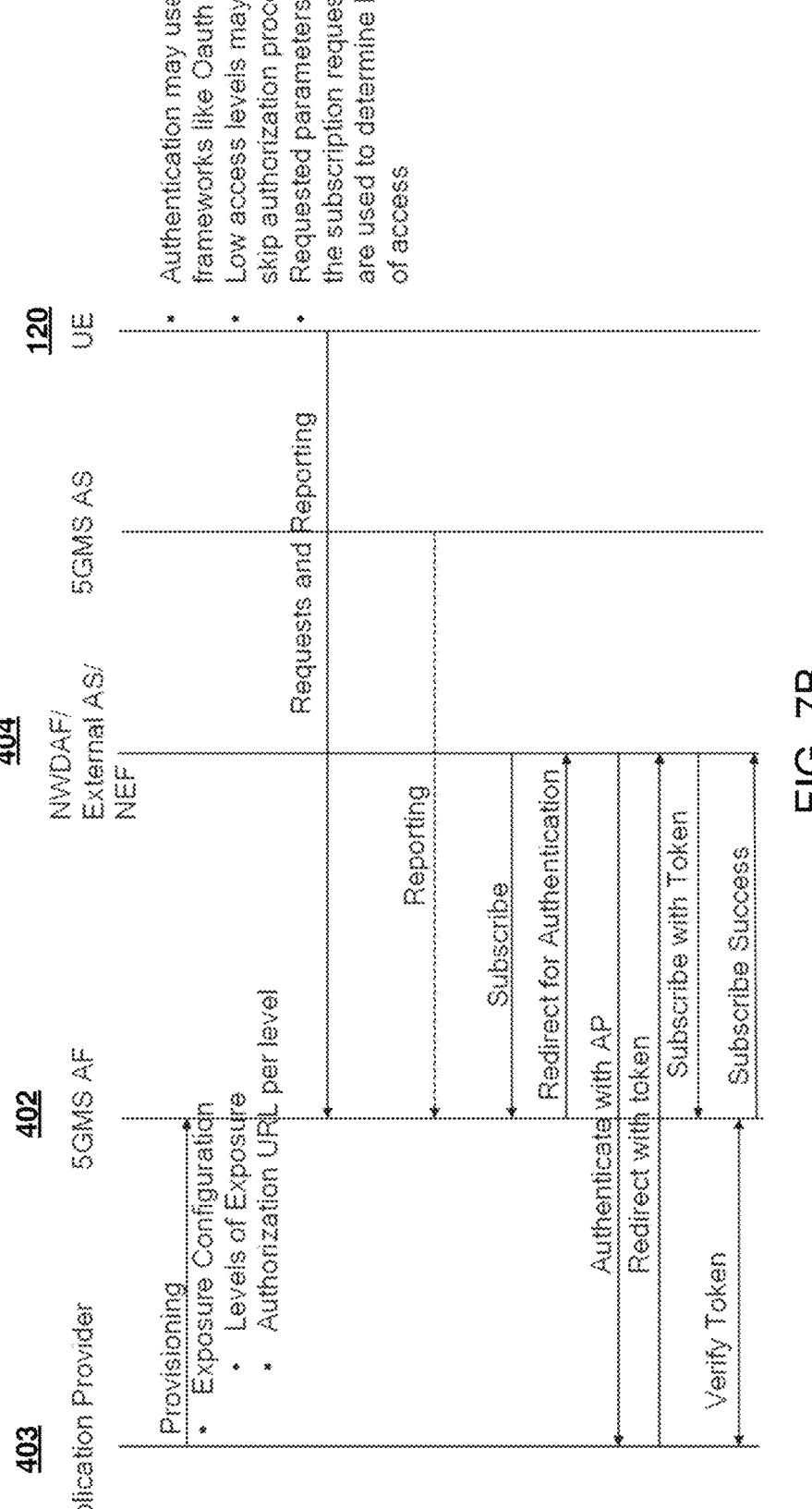
FIG. 7B is a call flow diagram illustrating interactions in a 5G system for controlling access to logs associated with a service or application in accordance with various embodiments.

FIG. 7B is a call flow diagram illustrating interactions in a 5G system for controlling access to logs associated with a service or application in accordance with various embodiments. With reference to FIGS. 1-7B, the access authorization procedure may include the illustrated interactions between the application provider (e.g., AP server 403), a 5GMS AF (e.g., AF server 402), a NWDAF (e.g., NWDAF 404), 5GMS application service (AS), and a UE (e.g., wireless device 120). The AP server 403 may provide the AF server 402 with exposure level configurations and authorization URLs on a per level of exposure basis in an access configuration message. The wireless device 120 may report data (e.g., metrics, measurements, statuses, statistics, other information, etc.) to the AF server 402. The NWDAF 404 may subscribe to the AF server 402 for the logs of the data (e.g., metrics, measurements, statuses, statistics, other information, etc.). The AF server 402 may redirect the NWDAF 404 to the authentication URL. The NWDAF 404 may authenticate itself with the AP server 403 and receive a token from the AP server 403. The NWDAF 404 may subscribe with the token to the AF server 402, the AF server 402 may verify the token with the AP server 403, and the NWDAF 404 may be successfully subscribed upon authentication. While FIG. 7B illustrates various authentication operations, these are merely examples, and other authentication operations (e.g., Oauth 2.0, other authorization protocol operations, etc.) may be substituted for the operations in FIG. 7B and/or authentication may not be required, such as for lower level authorization or default exposure levels.

Figure 8:
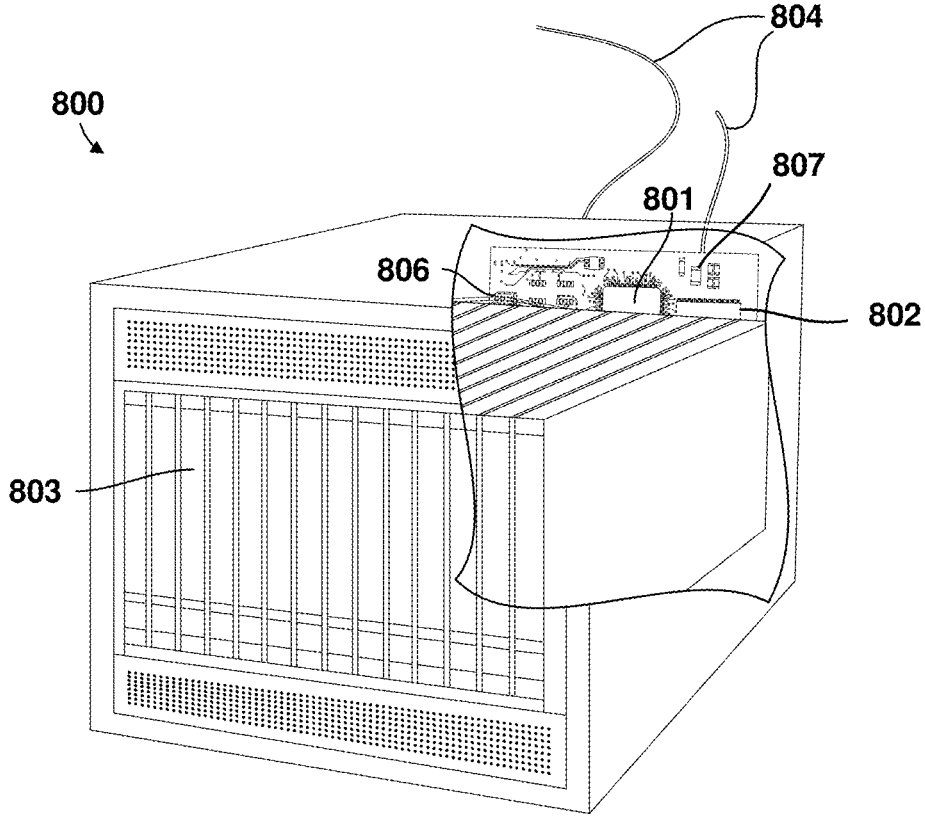
FIG. 8 is a component block diagram of a network computing device suitable for use with various embodiments.

FIG. 8 is a component block diagram of a network computing device 800 suitable for use with various embodiments. Such network computing devices may include at least the components illustrated in FIG. 8. With reference to FIGS. 1-8, the network computing device 800 (e.g., an AF server 402, an AP server 141, 403, NWDAF 404, etc.) may include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
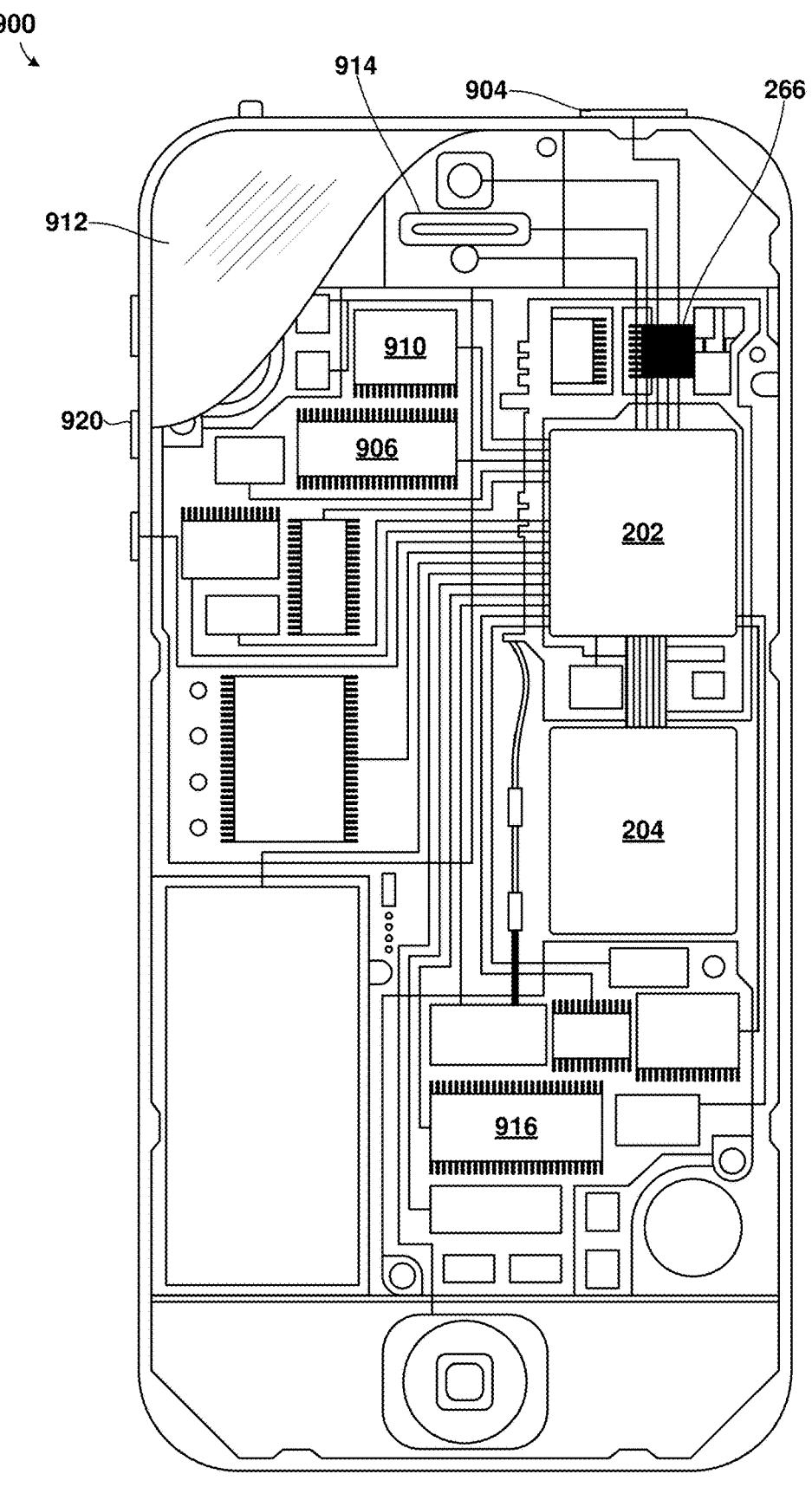
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (e.g., the wireless device 120, 120*a*-120*e*, 200), an example of which is illustrated in FIG. 9 in the form of a smartphone. The wireless device 900 may include a first SOC 202 (e.g., a SOC-CPU) coupled to a second SOC 204 (e.g., a 5G capable SOC). The first and second SOCs 202, 204 may be coupled to internal memory 906, 916, a display 912, and to a speaker 914. Additionally, the wireless device 900 may include an antenna 904 for sending and receiving electromagnetic radiation that may be connected to a wireless data link and/or cellular telephone transceiver 266 coupled to one or more processors in the first and/or second SOCs 202, 204. The wireless device 900 may also include menu selection buttons or rocker switches 920 for receiving user inputs.

The wireless device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 900 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for controlling access to analytics data associated with a service or application provisioned over a fifth generation (5G) system (5GS) network, comprising:

determining one or more event types and parameters to be enabled for information exposure for a service or application;

determining one or more exposure levels for the service or application;

determining aggregation rules for each of the one or more event types and parameters at each of the one or more exposure levels;

generating an access configuration message for the service or application, the access configuration message including an indication of the one or more event types and parameters, the one or more exposure levels, and the aggregation rules; and sending the access configuration message to an application function (AF) server.

2. The method of claim 1, further comprising:

receiving an authorization request associated with another computing device;

determining whether the other computing device is authorized for access to the analytics data for the service or application;

determining an exposure level for the other computing device in response to determining the other computing device is authorized for access to the analytics data for the service or application; and sending an authorization confirmation indicating the exposure level for the other computing device.

3. The method of claim 2, wherein the authorization confirmation comprises a token for the other computing device indicating the exposure level for the other computing device.

4. The method of claim 2, wherein the other computing device is a Network Data Analytics Function (NWDAF) server.

5. The method of claim 1, wherein the aggregation rules comprise aggregation functions, aggregation periods, and aggregation groups for the service or application.

6. The method of claim 5, wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription service, a subscription type, or all users together.

7. The method of claim 1, wherein the one or more event types comprise one or more of content hosting event types, Quality of Service (QOS)/charging and network assistance event types, consumption event types, or Quality of Experience (QoE) event types.

8. The method of claim 1, wherein the service or application is a 5G Media Streaming (5GMS) service or application.

9. A method for controlling access to analytics data associated with a service or application performed by a processing system implemented in circuitry of an application function (AF) server of a fifth generation (5G) system (5GS) network, comprising:

receiving a subscription request for analytics data of the service or application from a computing device, the subscription request including data representing one or more event types and parameters and aggregation rules for the analytics data;

determining an exposure level of the computing device;

determining the event types and parameters for the service or application and aggregation rules for the event types and parameters based at least in part on the subscription request and the exposure level of the computing device;

generating a subscription response message for the computing device indicating the one or more event types and parameters for the service or application and aggregation rules for the event types and parameters; and sending the subscription response message to the computing device.

10. The method of claim 9, further comprising:

receiving reports for the service or application from one or more wireless devices consuming the service or application;

receiving a request for available analytics data from the computing device;

authenticating the computing device in response to receiving the request for the available analytics data from the computing device;

determining an exposure level of the computing device based on the authentication;

generating a logs report according to the exposure level for the service or application associated with the determined exposure level of the computing device based on the reports for the service or application from the one or more wireless devices consuming the service or application; and sending the logs report to the computing device.

11. The method of claim 9, wherein determining an exposure level of the computing device comprises authenticating a token for the computing device indicating the exposure level for the computing device.

12. The method of claim 9, wherein the computing device is a Network Data Analytics Function (NWDAF) server.

13. The method of claim 9, wherein the aggregation rules comprise aggregation functions, aggregation periods, or aggregation groups for the service or application.

14. The method of claim 13, wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription service, a subscription type, or all users together.

15. The method of claim 9, wherein the one or more event types comprise one or more of content hosting event types, Quality of Service (QOS)/charging and network assistance event types, consumption event types, or Quality of Experience (QoE) event types.

16. The method of claim 9, wherein the service or application is a 5G Media Streaming (5GMS) service or application.

17. A server device for controlling access to analytics data, the server device comprising:

a processing system implemented in circuitry and configured to:

determine one or more event types and parameters to be enabled for information exposure for a service or application;

determine one or more exposure levels for the service or application;

determine aggregation rules for each of the one or more event types and parameters at each of the one or more exposure levels;

generate an access configuration message for the service or application, the access configuration message including an indication of the one or more event types and parameters, the one or more exposure levels, and the aggregation rules; and send the access configuration message to an application function (AF) server.

18. The server of claim 17, wherein the processing system is further configured to:

receive an authorization request associated with a computing device;

determine whether the other computing device is authorized for access to analytics data for the service or application;

determine an exposure level for the other computing device in response to determining the other computing device is authorized for access to the analytics data for the service or application; and send an authorization confirmation indicating the exposure level for the computing device.

19. The server of claim 18, wherein the authorization confirmation comprises a token for the computing device indicating the exposure level for the other computing device.

20. The server of claim 17, wherein the aggregation rules comprise one or more of aggregation functions, aggregation periods, or aggregation groups for the service or application.

21. The server of claim 20, wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription type, or all users together.

22. The server of claim 17, wherein the one or more event types comprise one or more of content hosting event types, Quality of Service (QOS)/charging and network assistance event types, consumption event types, or Quality of Experience (QoE) event types.

23. The server of claim 17, wherein the service or application is a 5G Media Streaming (5GMS) service or application.

24. An application function (AF) server of a fifth generation (5G) system (5GS) network, comprising:

a processing system implemented in circuitry and configured to:

receive a subscription request for analytics data of a service or application from a computing device, the subscription request including data representing one or more event types and parameters and aggregation rules for the analytics data;

determine an exposure level of the computing device;

determine event types and parameters for the service or application and aggregation rules for the event types and parameters based at least in part on the subscription request and the exposure level of the computing device;

generate a subscription response message for the computing device indicating the one or more event types and parameters for the service or application and aggregation rules for the event types and parameters; and send the subscription response message to the computing device.

25. The AF server of claim 24, wherein the processing system is further configured to:

receive reports for the service or application from one or more wireless devices consuming the service or application;

receive a request for available analytics data from the computing device;

authenticate the computing device in response to receiving the request for available analytics data from the computing device;

determine an exposure level of the computing device based on the authentication;

generate a logs report according to the exposure level for the service or application associated with the determined exposure level of the computing device based on the reports for the service or application; and send the logs report to the computing device.

26. The AF server of claim 24, wherein the processing system is further configured to determine an exposure level of the computing device by authenticating a token for the computing device indicating the exposure level for the computing device.

27. The AF server of claim 24, wherein the aggregation rules comprise one of aggregation functions, aggregation periods, or aggregation groups for the service or application.

28. The AF server of claim 27, wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription type, or all users together.

29. The AF server of claim 24, wherein the one or more event types comprise one or more of content hosting event types, Quality of Service (QOS)/charging and network assistance event types, consumption event types, or Quality of Experience (QoE) event types.

30. The AF server of claim 24, wherein the service or application is a 5G Media Streaming (5GMS) service or application.

31. A method performed by a processing system implemented in circuitry of a service or application provider server for controlling access to analytics data associated with a service or application provisioned over a fifth generation system (5GS) network, comprising:

determining one or more event types and parameters to be enabled for information exposure for a service or application;

determining one or more exposure levels for the service or application;

determining aggregation rules for each of the one or more event types and parameters at each of the one or more exposure levels, the aggregation rules defining, for each respective exposure level, a level of granularity of analytics data that can be provided to an entity associated with the respective exposure level;

generating an access configuration message for the service or application, the access configuration message including an indication of the one or more event types and parameters, the one or more exposure levels, and the aggregation rules; and sending the access configuration message to an application function (AF) server.

32. The method of claim 31, further comprising:

receiving an authorization request associated with another computing device;

determining whether the other computing device is authorized for access to analytics data for the service or application;

determining an exposure level for the other computing device in response to determining the other computing device is authorized for access to analytics data for the service or application; and sending an authorization confirmation indicating the exposure level for the other computing device.

33. The method of claim 32, wherein the authorization confirmation comprises a token for the other computer device indicating the exposure level for the other computing device.

34. The method of claim 32, wherein the other computing device is a Network Data Analytics Function (NWDAF) server.

35. The method of claim 31, wherein the aggregation rules comprise aggregation functions, aggregation periods, and aggregation groups for the service or application; and wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription service, a subscription type, or all users together.

36. The method of claim 31, wherein the one or more event types comprise one or more of content hosting event types, Quality of Service (QOS)/charging and network assistance event types, consumption event types, or Quality of Experience (QoE) event types.

37. The method of claim 31, wherein the service or application is a 5G Media Streaming (5GMS) service or application.

38. A method for controlling access to analytics data associated with a service or application performed by a processing system implemented in circuitry of an application function (AF) server of a fifth generation system (5GS) network, comprising:

receiving an access configuration message from a service or application provider, the access configuration message including an indication of one or more event types and parameters, one or more exposure levels, and aggregation rules for a service or application, the aggregation rules defining, for each respective exposure level, a level of granularity of analytics data that can be provided to an entity associated with the respective exposure level;

receiving a subscription request for the analytics data of the service or application from another computing device;

determining an exposure level of the other computing device;

determining event types and parameters for the service or application and aggregation rules for the event types and parameters based at least in part on the access configuration message for the service or application and the exposure level of the other computing device;

generating a subscription response message for the other computing device indicating the one or more event types and parameters for the service or application and aggregation rules for the event types and parameters; and sending the subscription response message to the other computing device.

39. The method of claim 38, further comprising:

receiving reports for the service or application from one or more wireless devices consuming the service or application;

receiving a request for available analytics data from the other computing device;

authenticating the other computing device in response to receiving the request for available analytics data from the other computing device;

determining an exposure level of the other computing device based on the authentication;

generating an analytics data report according to the exposure level for the service or application associated with the exposure level of the other computing device based on the reports for the service or application from the one or more wireless devices consuming the service or application; and sending the analytics data report to the other computing device.

40. The method of claim 38, wherein determining the exposure level of the other computing device comprises authenticating a token for the other computing device indicating the exposure level for the other computing device.

41. The method of claim 38, wherein the other computing device is a Network Data Analytics Function (NWDAF) server.

42. The method of claim 38, wherein the aggregation rules comprise aggregation functions, aggregation periods, or aggregation groups for the service or application; and wherein:

the aggregation functions comprise one or more of a COUNT function, an AVERAGE function, a MEDIAN function, a MINIMUM function, a MAXIMUM function, or a SUM function;

the aggregation periods comprise a session or a time period; and the aggregation groups comprise users individually, user groups, user locations, a content identifier, a subscription service, a subscription type, or all users together.

43. An application provider server comprising:

a processing system implemented in circuitry implemented in circuitry and configured to:

determine one or more event types and parameters to be enabled for information exposure for a service or application;

determine one or more exposure levels for the service or application;

determine aggregation rules for each of the one or more event types and parameters at each of the one or more exposure levels, the aggregation rules defining, for each respective exposure level, a level of granularity of analytics data that can be provided to an entity associated with the respective exposure level;

generate an access configuration message for the service or application, the access configuration message including an indication of the one or more event types and parameters, the one or more exposure levels, and the aggregation rules; and send the access configuration message to an application function (AF) server.

44. An application function (AF) server of a fifth generation system (5GS) network, comprising:

a processing system implemented in circuitry and configured to:

receive an access configuration message from a service or application provider, the access configuration message including an indication of one or more event types and parameters, one or more exposure levels, and aggregation rules for a service or application, the aggregation rules defining, for each respective exposure level, a level of granularity of analytics data that can be provided to an entity associated with the respective exposure level;

receive a subscription request for the analytics data of the service or application from another computing device;

determine an exposure level of the other computing device;

determine event types and parameters for the service or application and aggregation rules for the event types and parameters based at least in part on the access configuration message for the service or application and the exposure level of the other computing device;

generate a subscription response message for the other computing device indicating the event types and parameters for the service or application and aggregation rules for the event types and parameters; and send the subscription response message to the other computing device.

* * * * *